United States Patent
Kim et al.

(10) Patent No.: US 10,836,399 B2
(45) Date of Patent: Nov. 17, 2020

(54) VEHICLE AND CONTROL METHOD THEREOF

(71) Applicant: LG Electronics Inc., Seoul (KR)

(72) Inventors: Soyoung Kim, Seoul (KR); Eunjoung Cho, Seoul (KR); Iljin Park, Seoul (KR)

(73) Assignee: LG Electronics Inc., Seoul (KR)

( * ) Notice: Subject to any disclaimer, the term of this patent is extended or adjusted under 35 U.S.C. 154(b) by 80 days.

(21) Appl. No.: 15/750,720

(22) PCT Filed: Sep. 9, 2015

(86) PCT No.: PCT/KR2015/009494
§ 371 (c)(1),
(2) Date: Feb. 6, 2018

(87) PCT Pub. No.: WO2017/039047
PCT Pub. Date: Mar. 9, 2017

(65) Prior Publication Data
US 2019/0001987 A1    Jan. 3, 2019

(30) Foreign Application Priority Data

Sep. 1, 2015   (KR) .................... 10-2015-0123755

(51) Int. Cl.
| B60W 40/06 | (2012.01) |
| B60W 50/14 | (2020.01) |
| B60W 40/10 | (2012.01) |
| B60W 40/02 | (2006.01) |
| B60W 50/00 | (2006.01) |

(52) U.S. Cl.
CPC ............ *B60W 40/06* (2013.01); *B60W 40/02* (2013.01); *B60W 40/10* (2013.01); *B60W 50/00* (2013.01);
(Continued)

(58) Field of Classification Search
CPC ...... B60W 40/06; B60W 40/02; B60W 40/10; B60W 50/00; B60W 50/14; B60K 2370/1438
(Continued)

(56) References Cited

U.S. PATENT DOCUMENTS

2013/0198802 A1 *   8/2013   Ricci ....................... H04L 67/12
                                                                    726/1
2013/0204466 A1 *   8/2013   Ricci ...................... G06F 3/0484
                                                                    701/2
(Continued)

FOREIGN PATENT DOCUMENTS

| KR | 10-2013-0090953 | 8/2013 |
| KR | 10-2014-0103415 | 8/2014 |
| KR | 10-2014-0106289 | 9/2014 |

*Primary Examiner* — Peter D Nolan
*Assistant Examiner* — Wae L Louie
(74) *Attorney, Agent, or Firm* — Fish & Richardson P.C.

(57) ABSTRACT

The present invention relates to a vehicle and a control method therefor. A vehicle according to an embodiment of the present invention comprises: a display unit; a communication unit configured to wirelessly communicate with an external device; and a control unit, capable of wirelessly communicating with the vehicle, for controlling the display unit so as to display a plurality of indicators corresponding to each of a plurality of other vehicles searched by the communication unit on the display unit, initiate wireless communications with a first other vehicle included in the plurality of other vehicles in response to a first user input, and display a user interface which guides shared contents receivable from the first other vehicle, wherein each of the indicators includes identification information of a specific vehicle of the plurality of other vehicles.

16 Claims, 25 Drawing Sheets

(52) U.S. Cl.
CPC ..... *B60W 50/14* (2013.01); *B60K 2370/1438* (2019.05); *B60R 2300/205* (2013.01); *B60R 2300/207* (2013.01); *B60W 2050/0081* (2013.01); *B60W 2050/0091* (2013.01); *B60W 2050/146* (2013.01); *B60W 2556/60* (2020.02)

(58) Field of Classification Search
USPC .......................................................... 701/41
See application file for complete search history.

(56) References Cited

U.S. PATENT DOCUMENTS

| | | | |
|---|---|---|---|
| 2013/0204484 A1* | 8/2013 | Ricci .................... | B60W 50/00 701/29.4 |
| 2013/0204943 A1* | 8/2013 | Ricci ................ | G08G 1/096791 709/204 |
| 2013/0218412 A1* | 8/2013 | Ricci .................... | G06F 3/0484 701/36 |
| 2014/0143839 A1* | 5/2014 | Ricci .................... | B60R 16/037 726/4 |
| 2014/0306834 A1* | 10/2014 | Ricci ....................... | G06F 21/00 340/902 |
| 2015/0185030 A1* | 7/2015 | Monroe ................. | G01C 21/20 701/532 |
| 2016/0070527 A1* | 3/2016 | Ricci ................ | G06Q 10/06398 715/716 |
| 2016/0086391 A1* | 3/2016 | Ricci .................... | G06Q 10/10 701/29.3 |
| 2016/0364679 A1* | 12/2016 | Cao ........................ | G06Q 50/30 |
| 2017/0334441 A1* | 11/2017 | Sen .................... | B60W 50/082 |
| 2019/0001987 A1* | 1/2019 | Kim .................... | B60W 30/165 |

* cited by examiner

[FIG. 1]
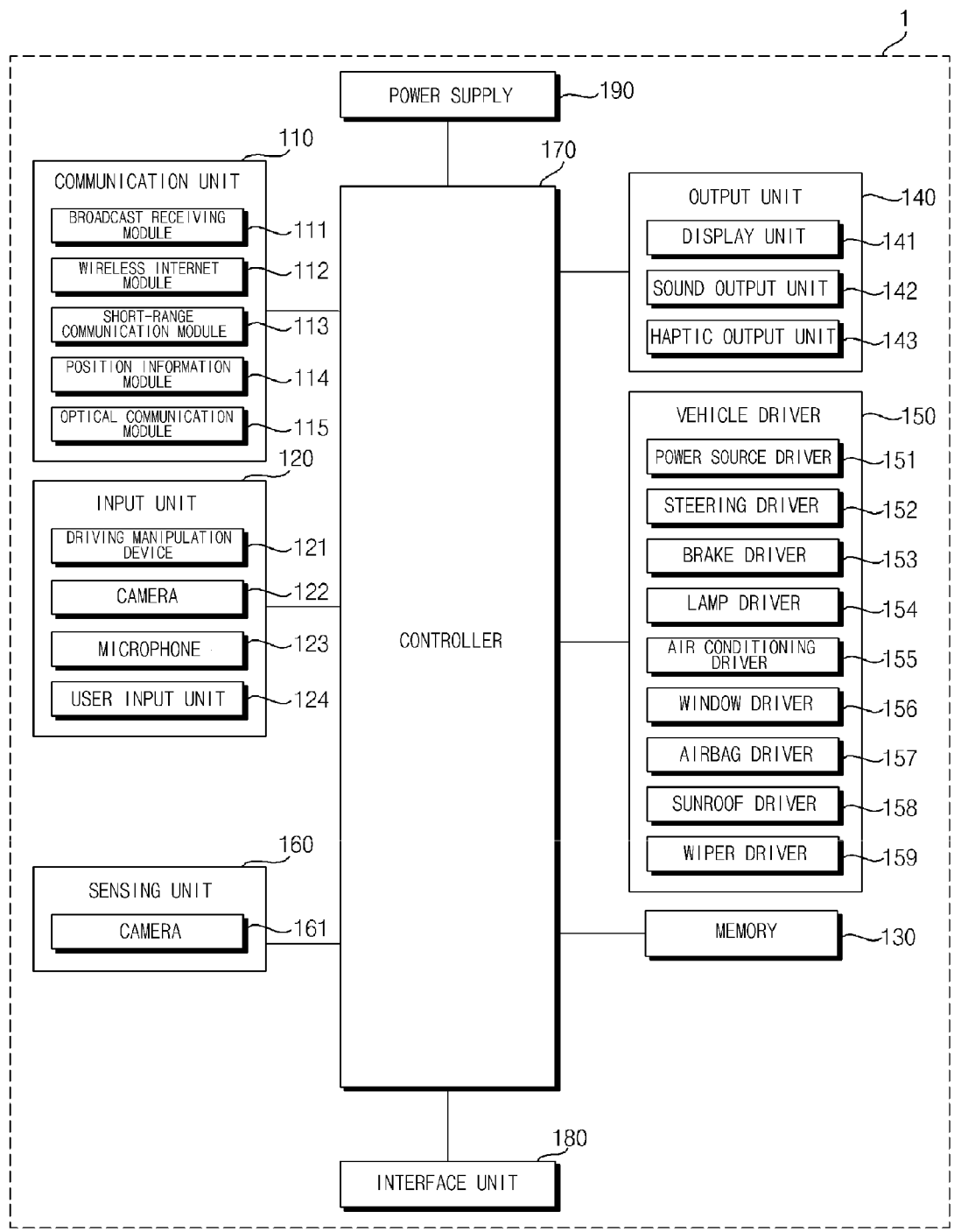

【FIG. 2】
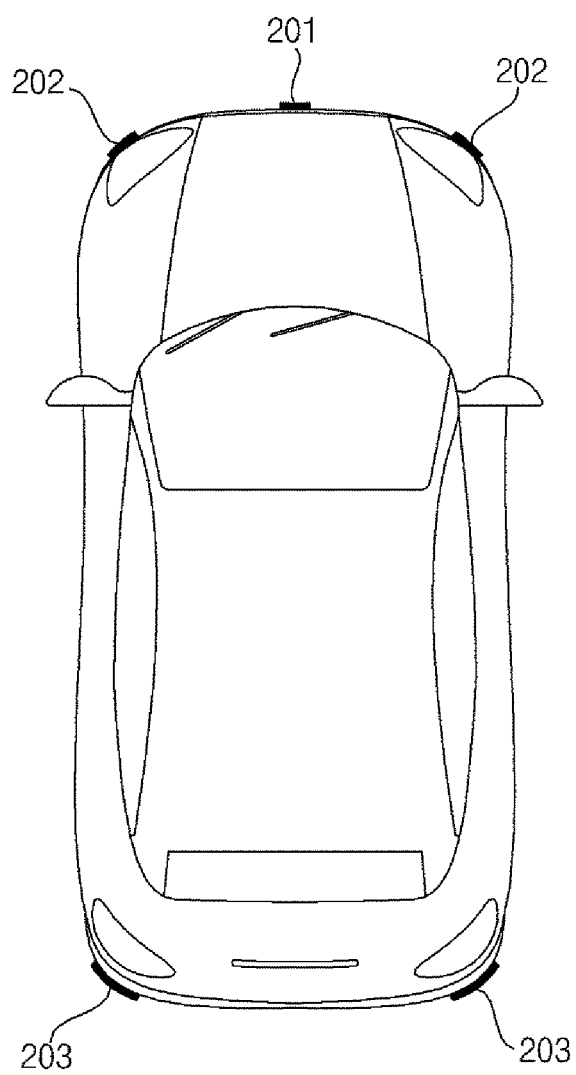

[FIG. 3]
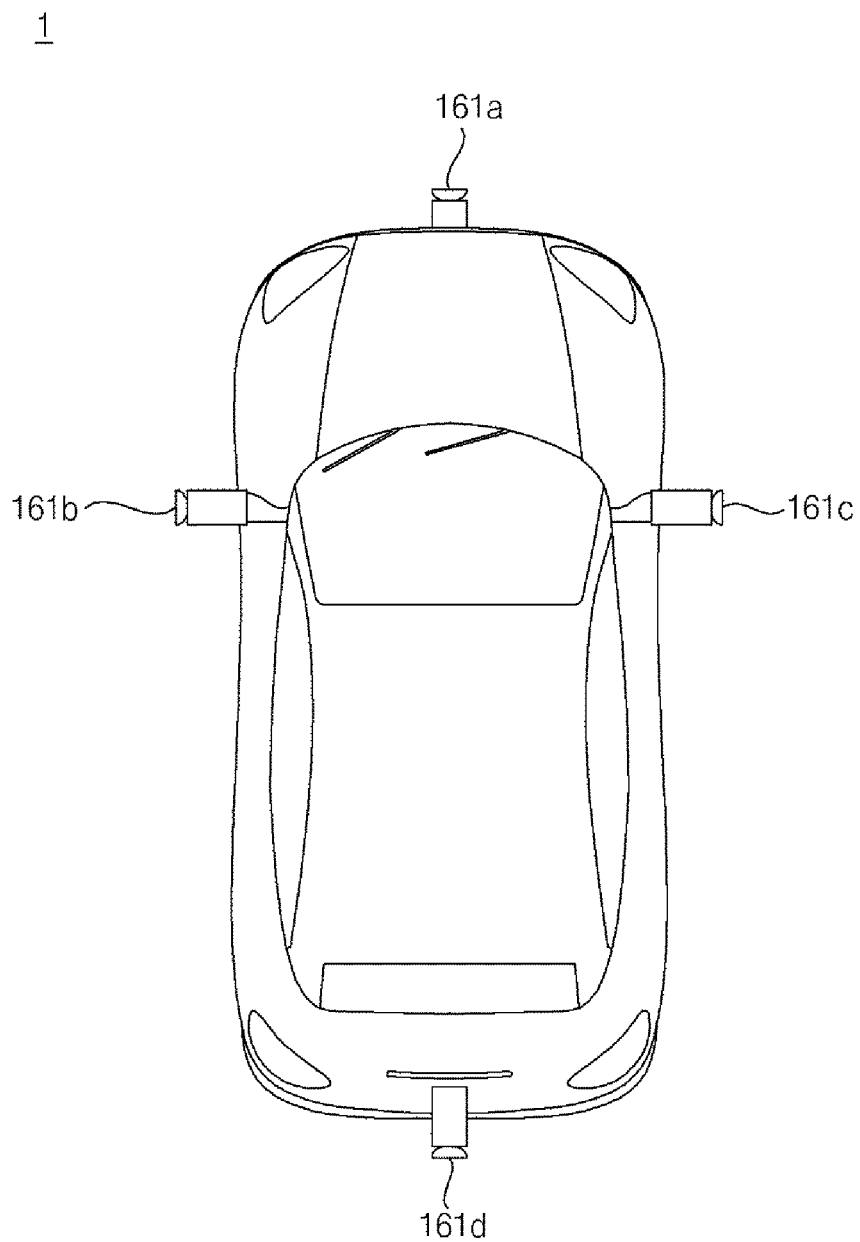

[FIG. 4]
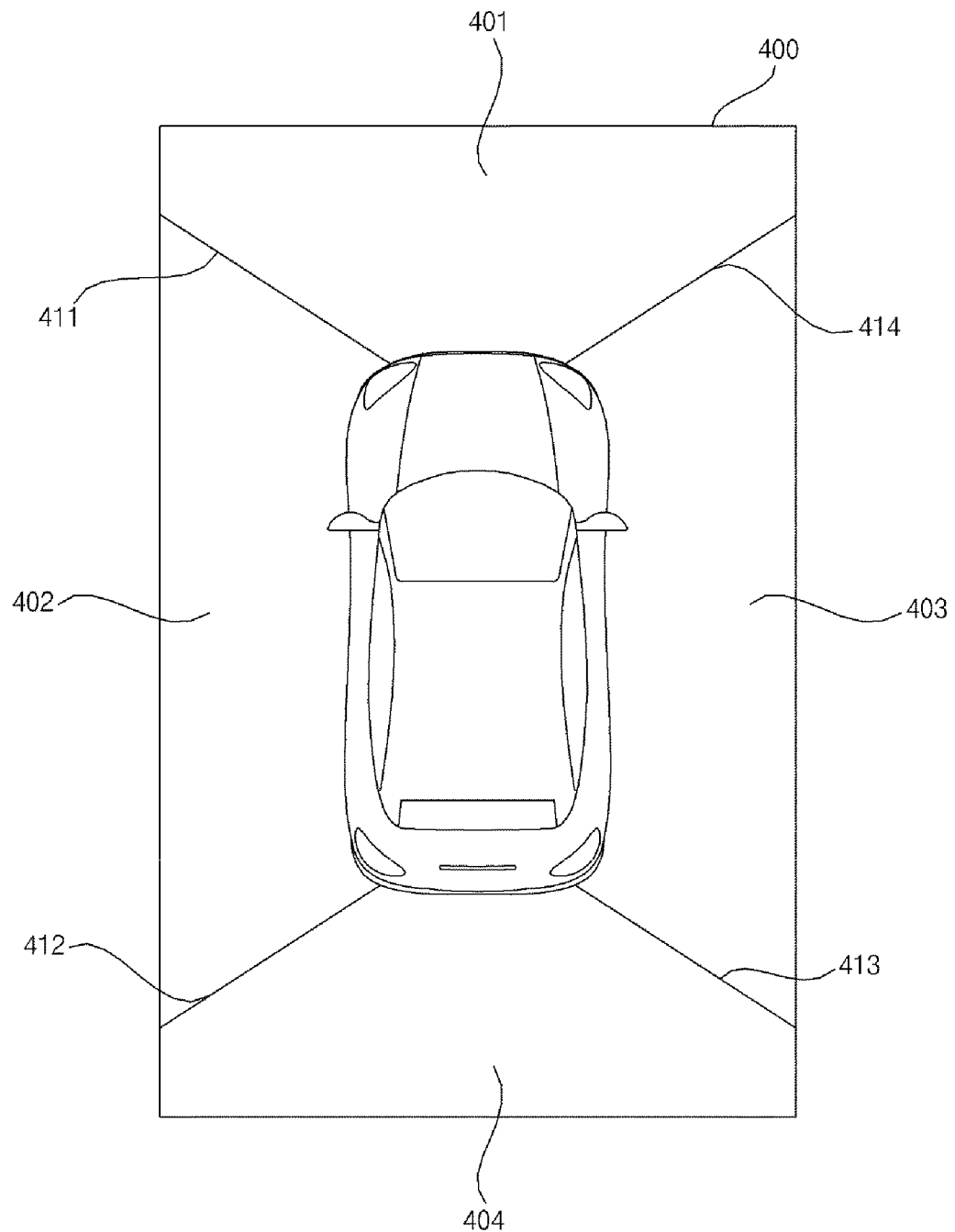

[FIG. 5]
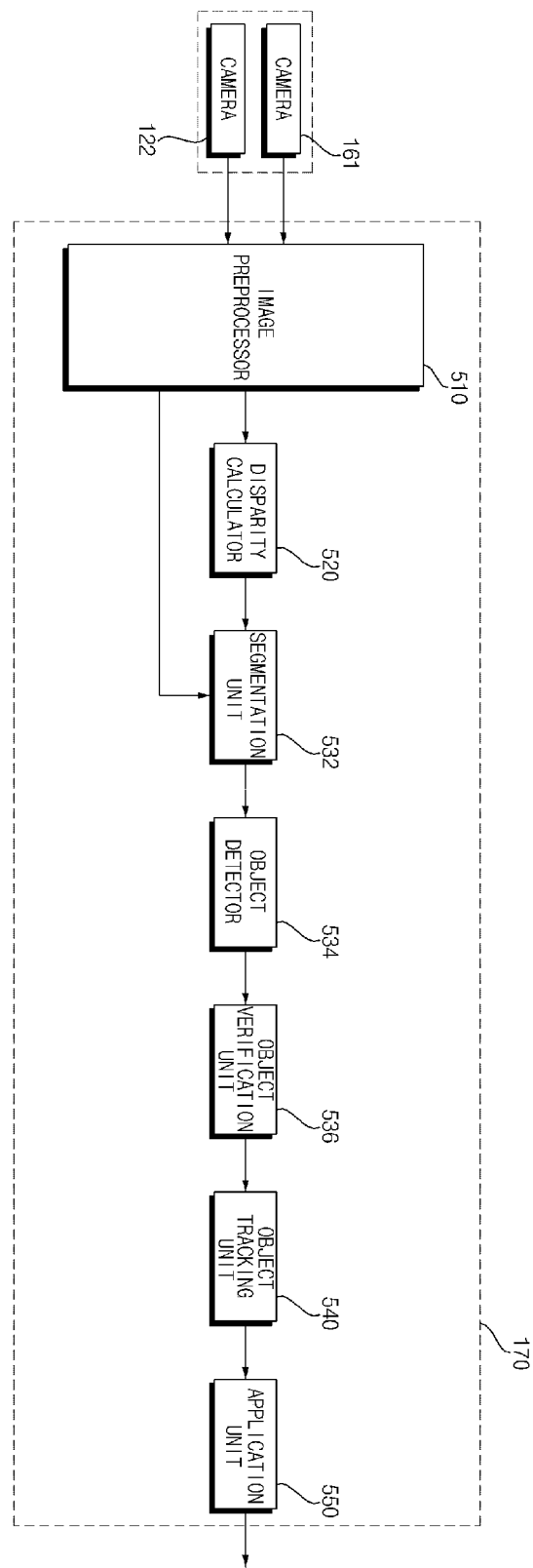

[FIG. 6a]
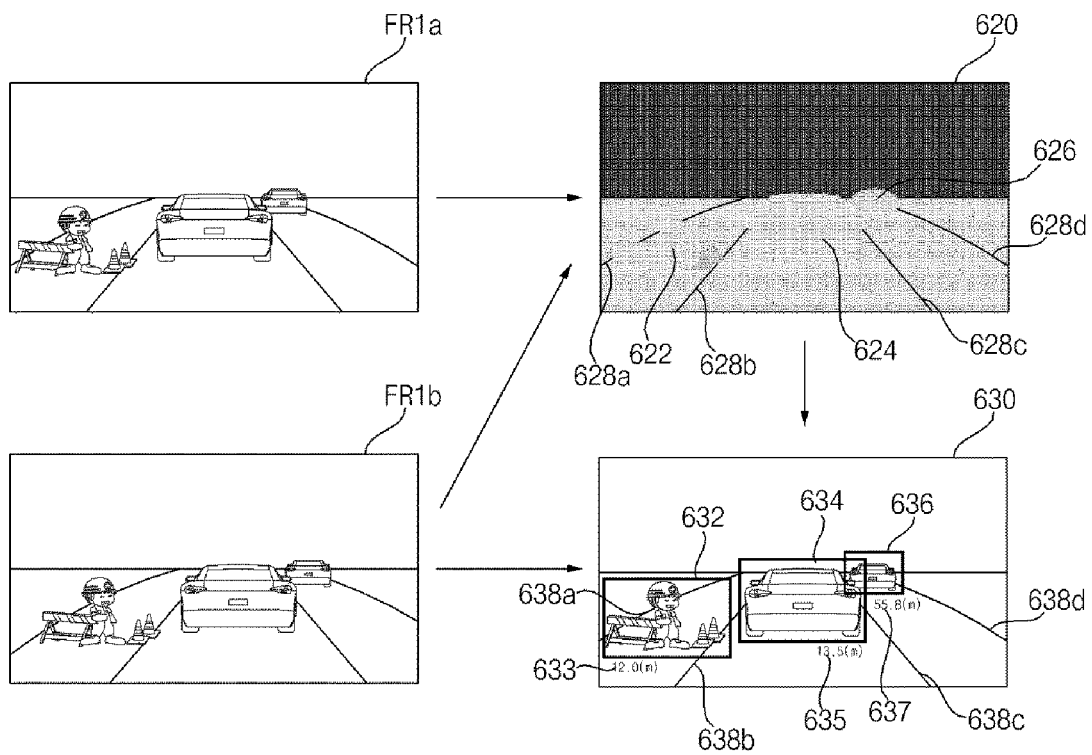

[FIG. 6b]
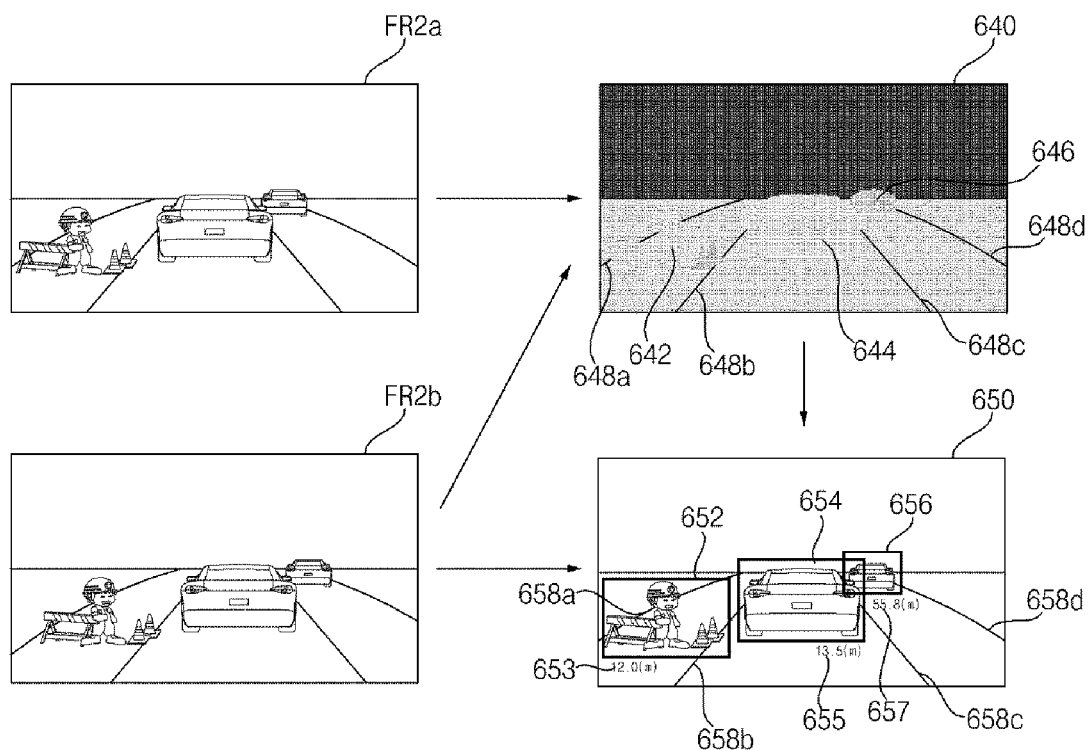

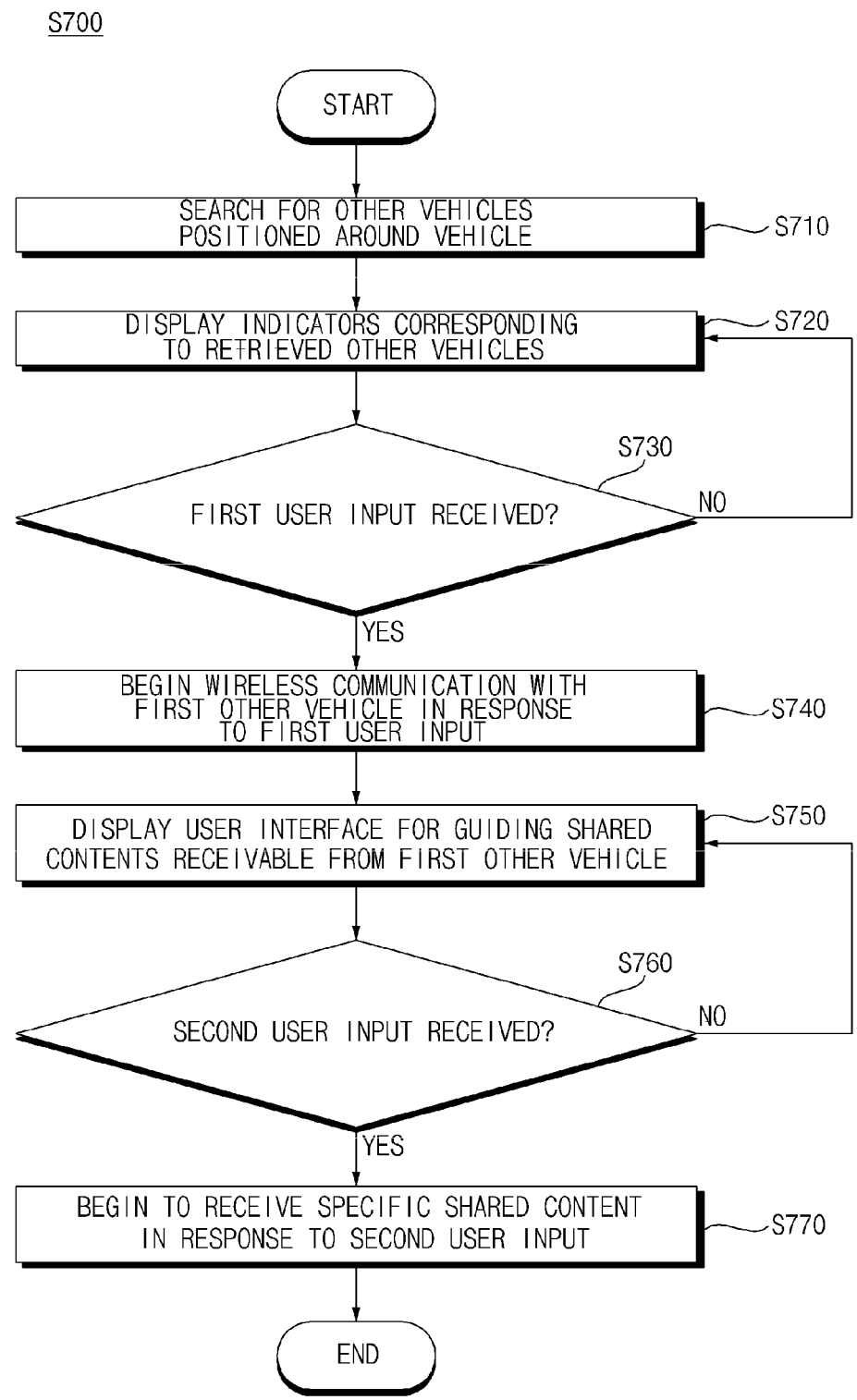
[FIG. 7]

[FIG. 8]
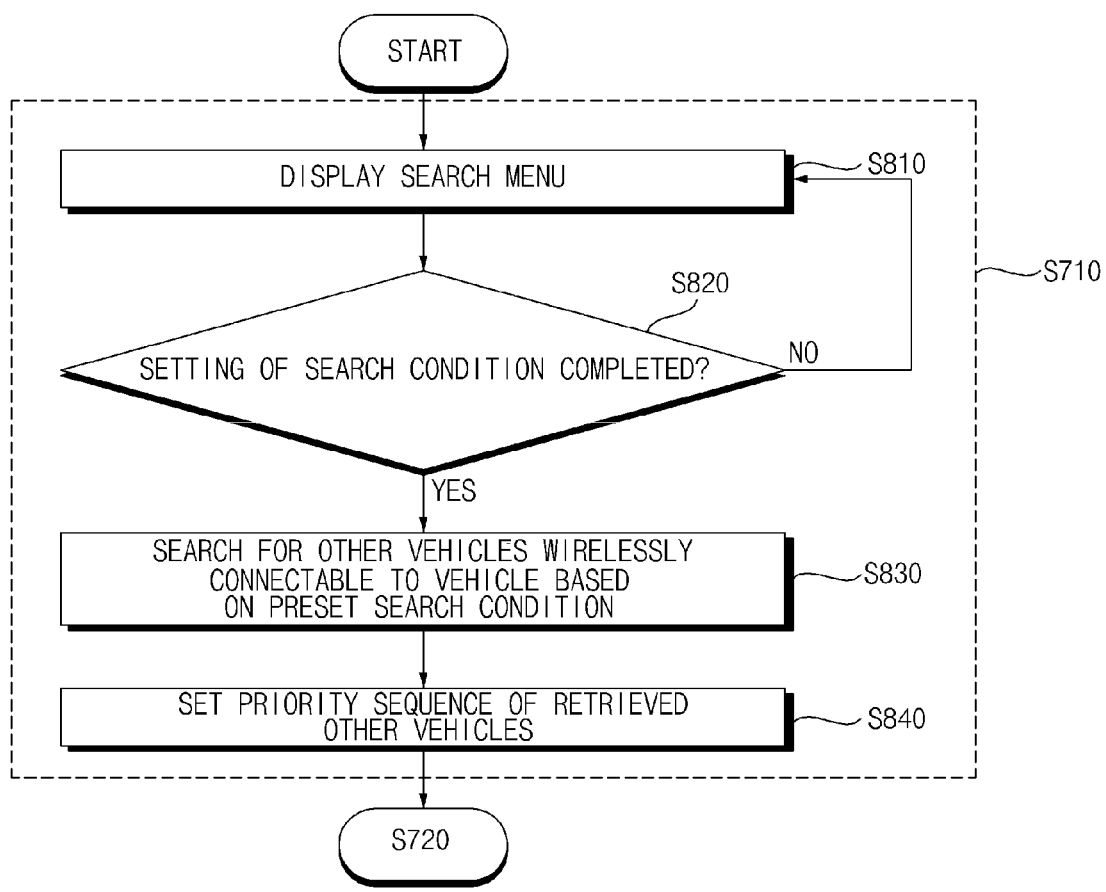

[FIG. 9]
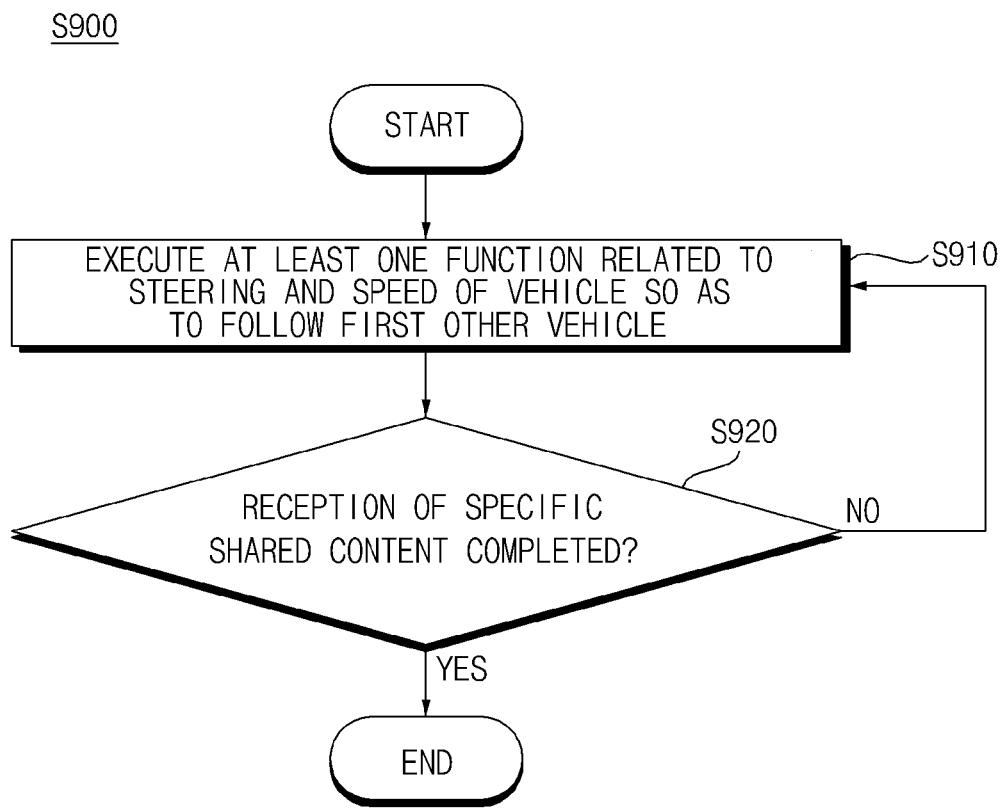

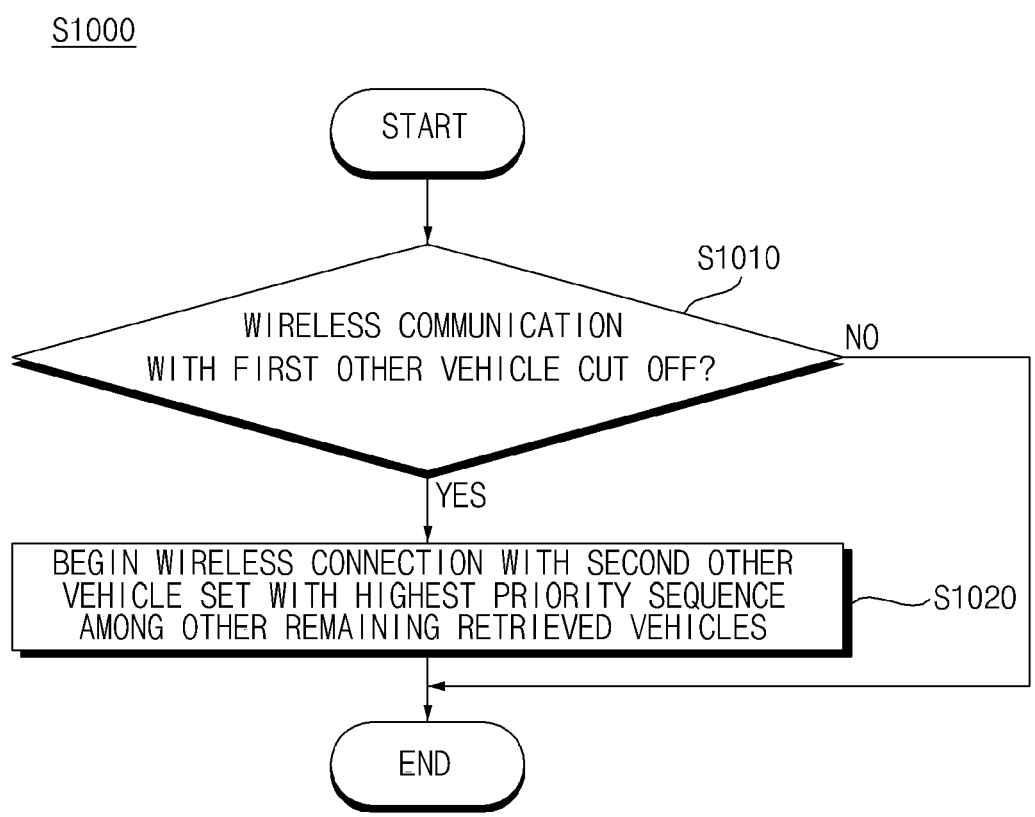

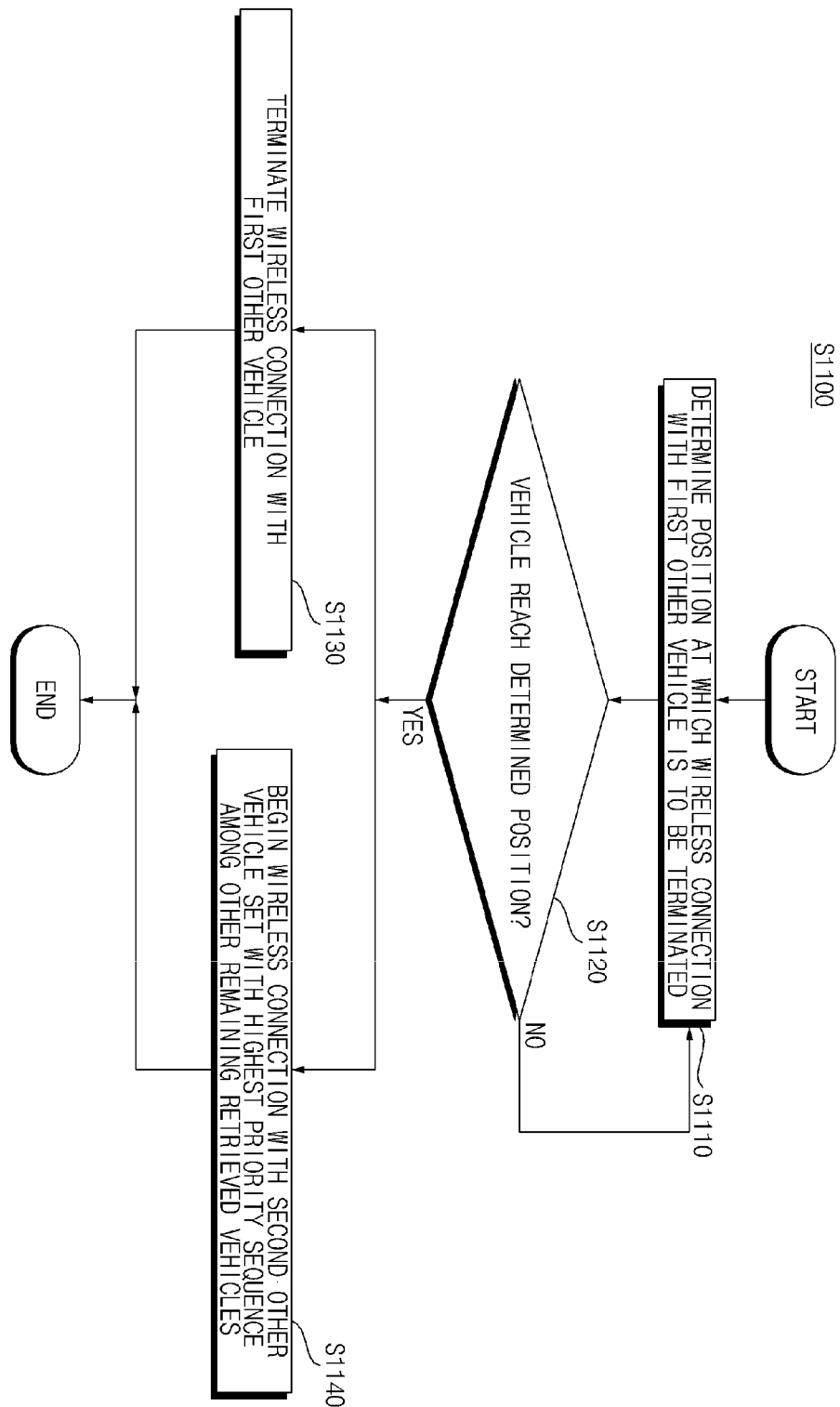
[FIG. 11]

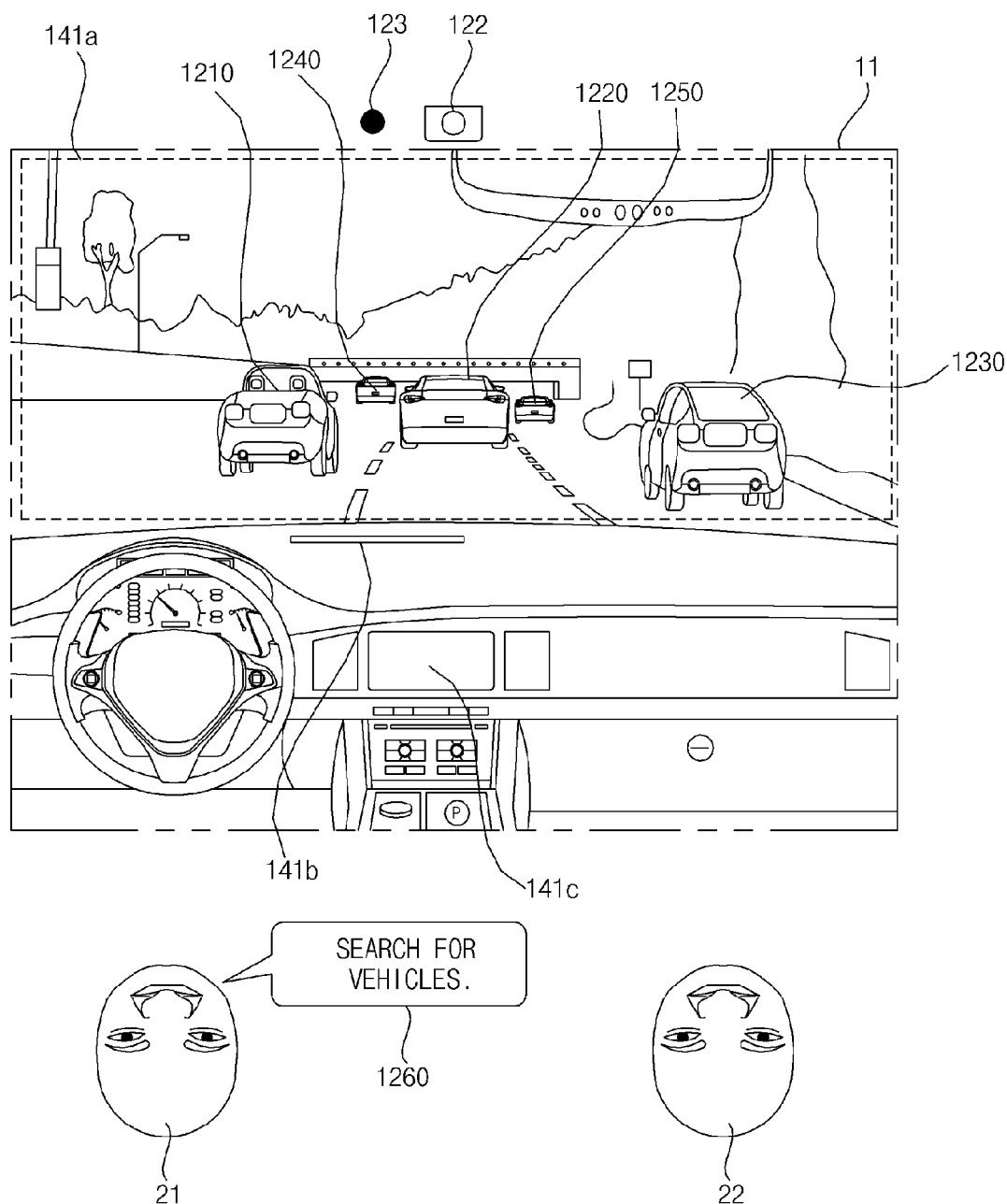

[FIG. 13]
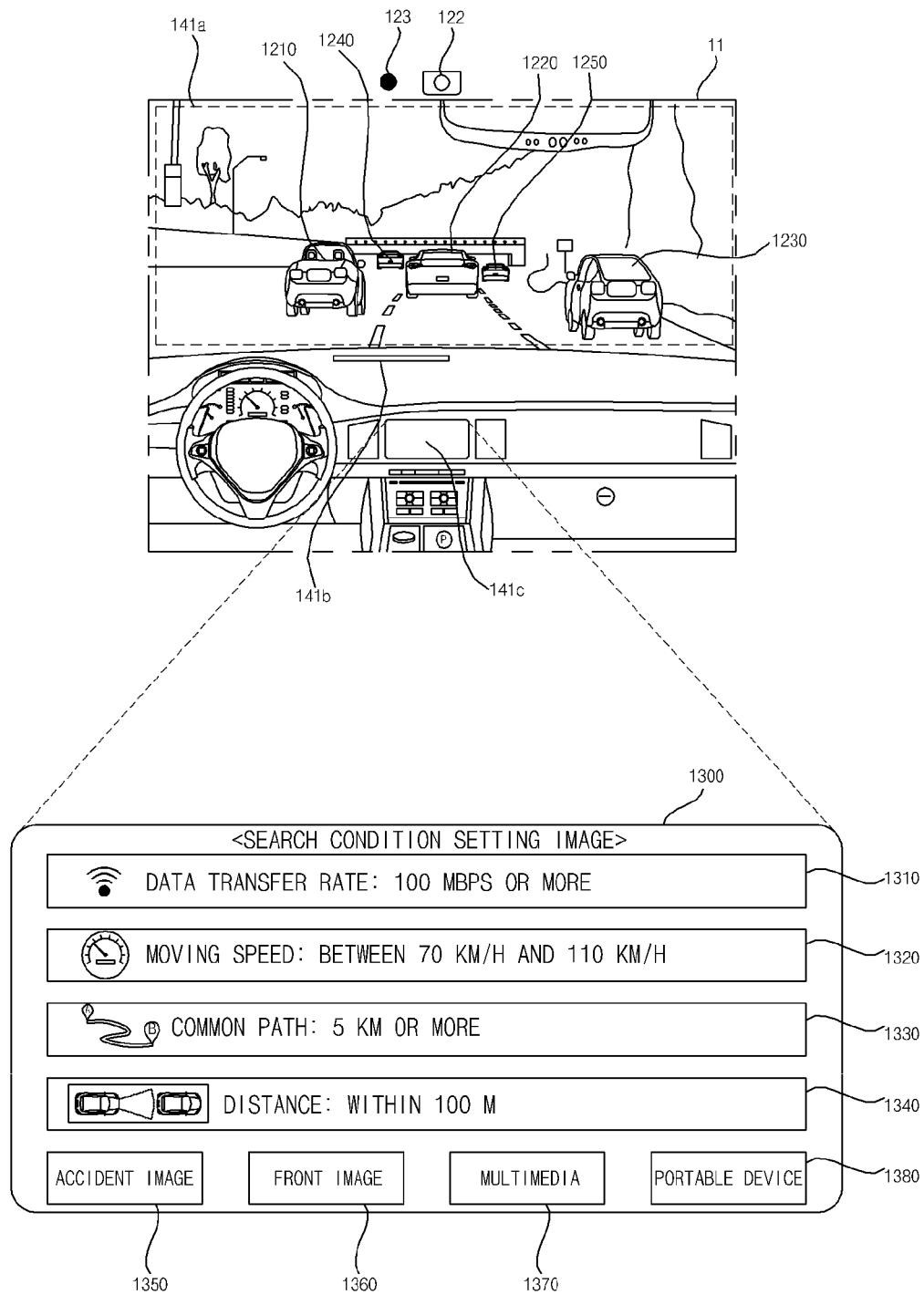

[FIG. 14a]
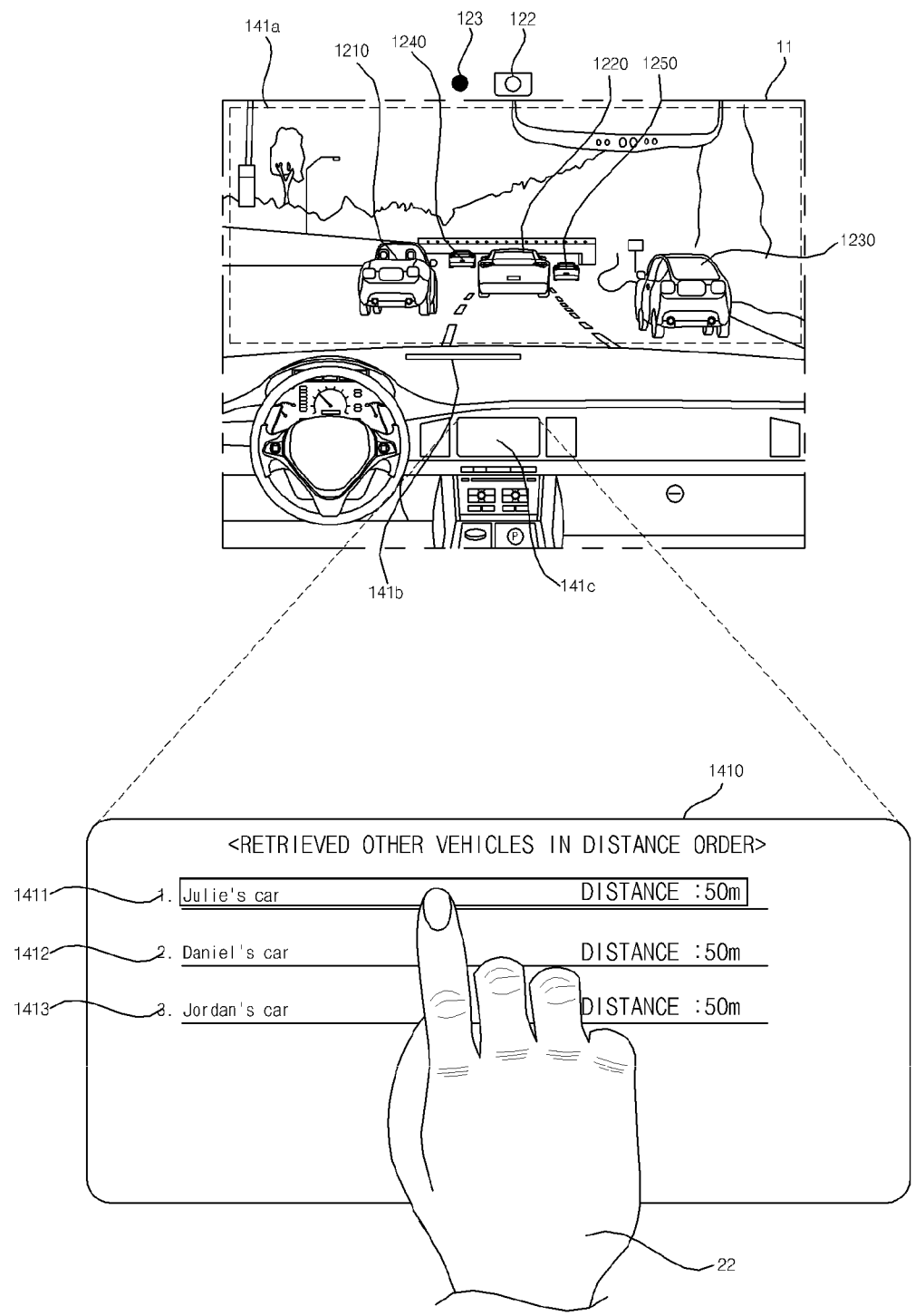

【FIG. 14b】
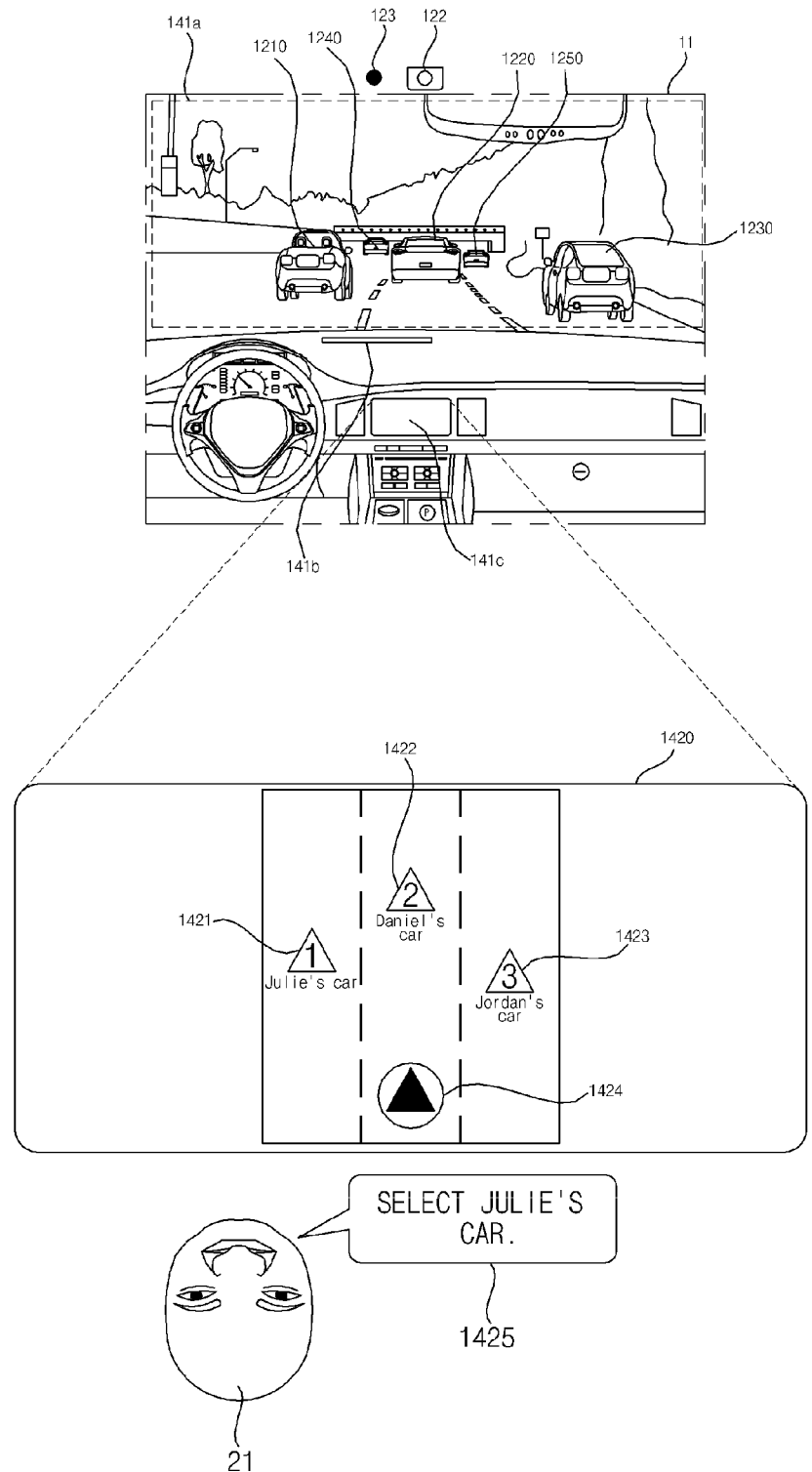

[FIG. 14c]
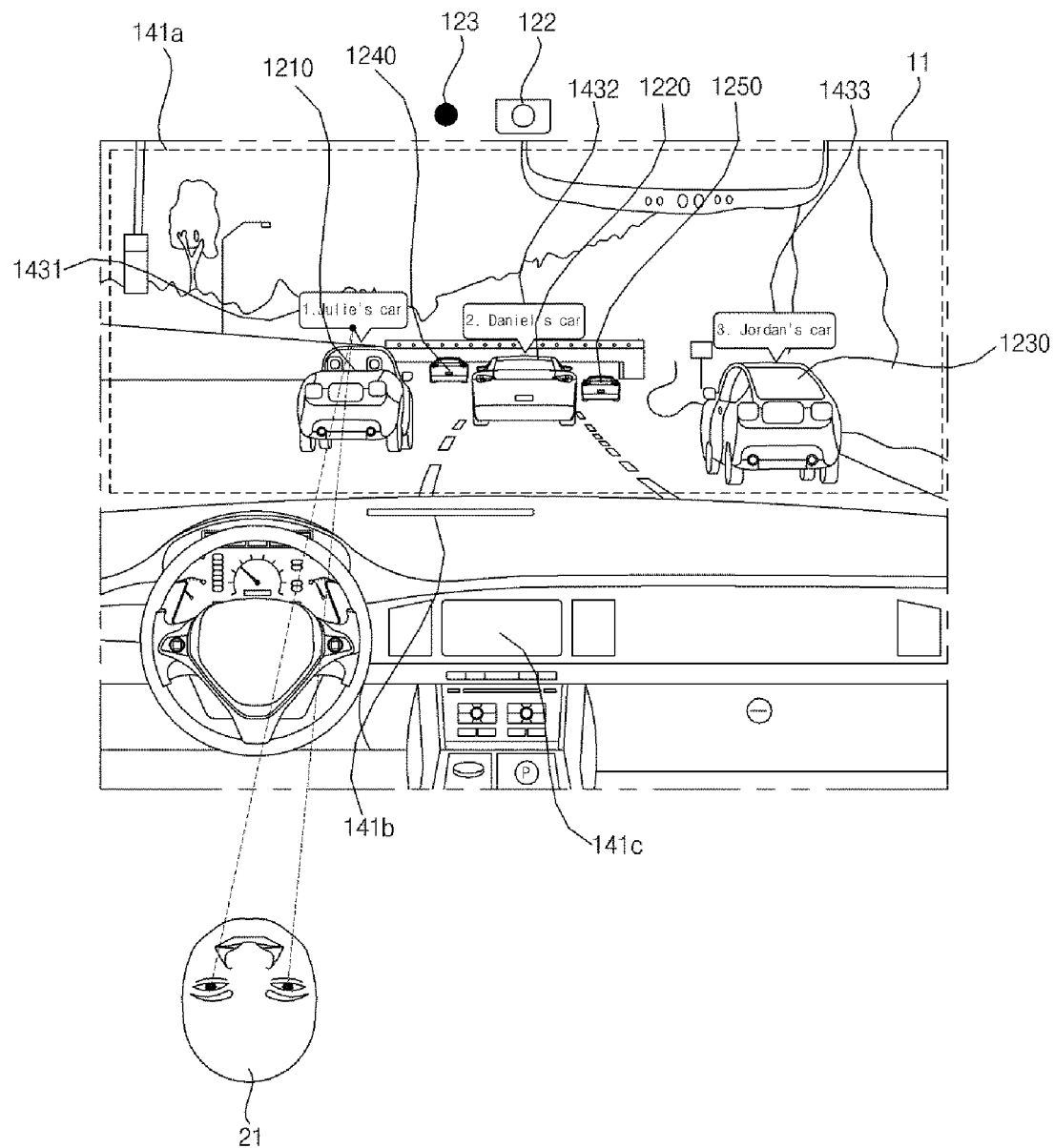

[FIG. 14d]
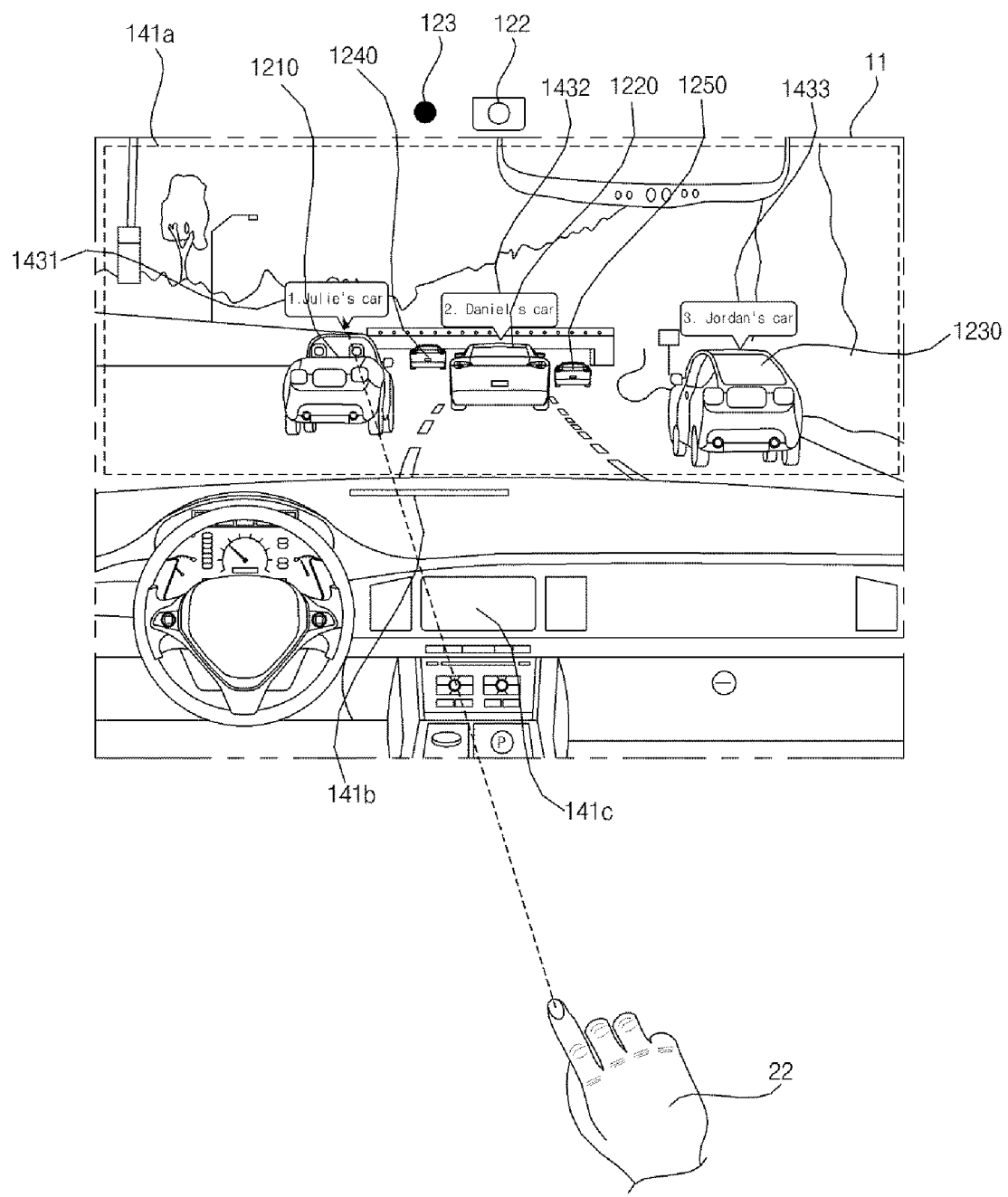

[FIG. 15a]
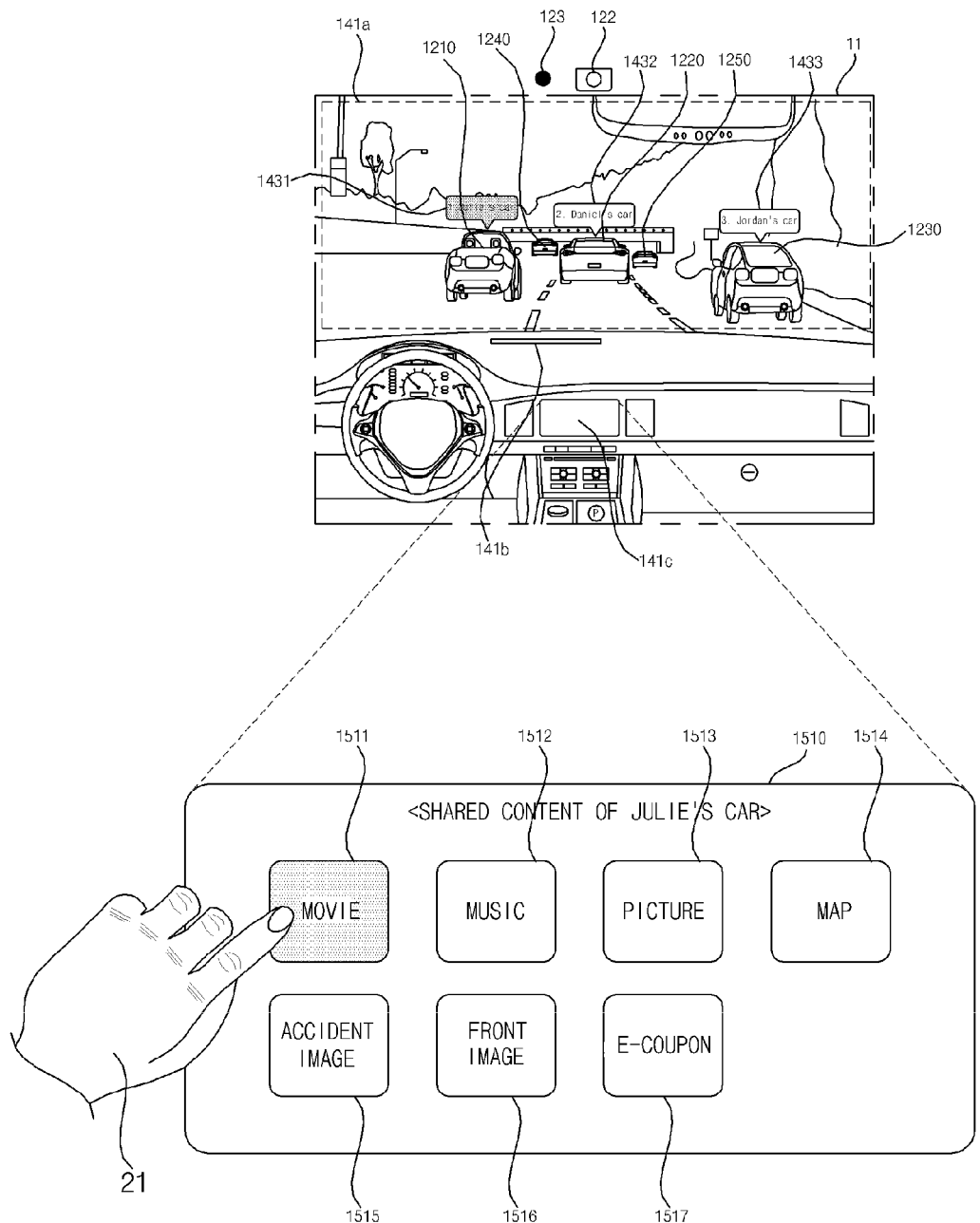

[FIG. 15b]
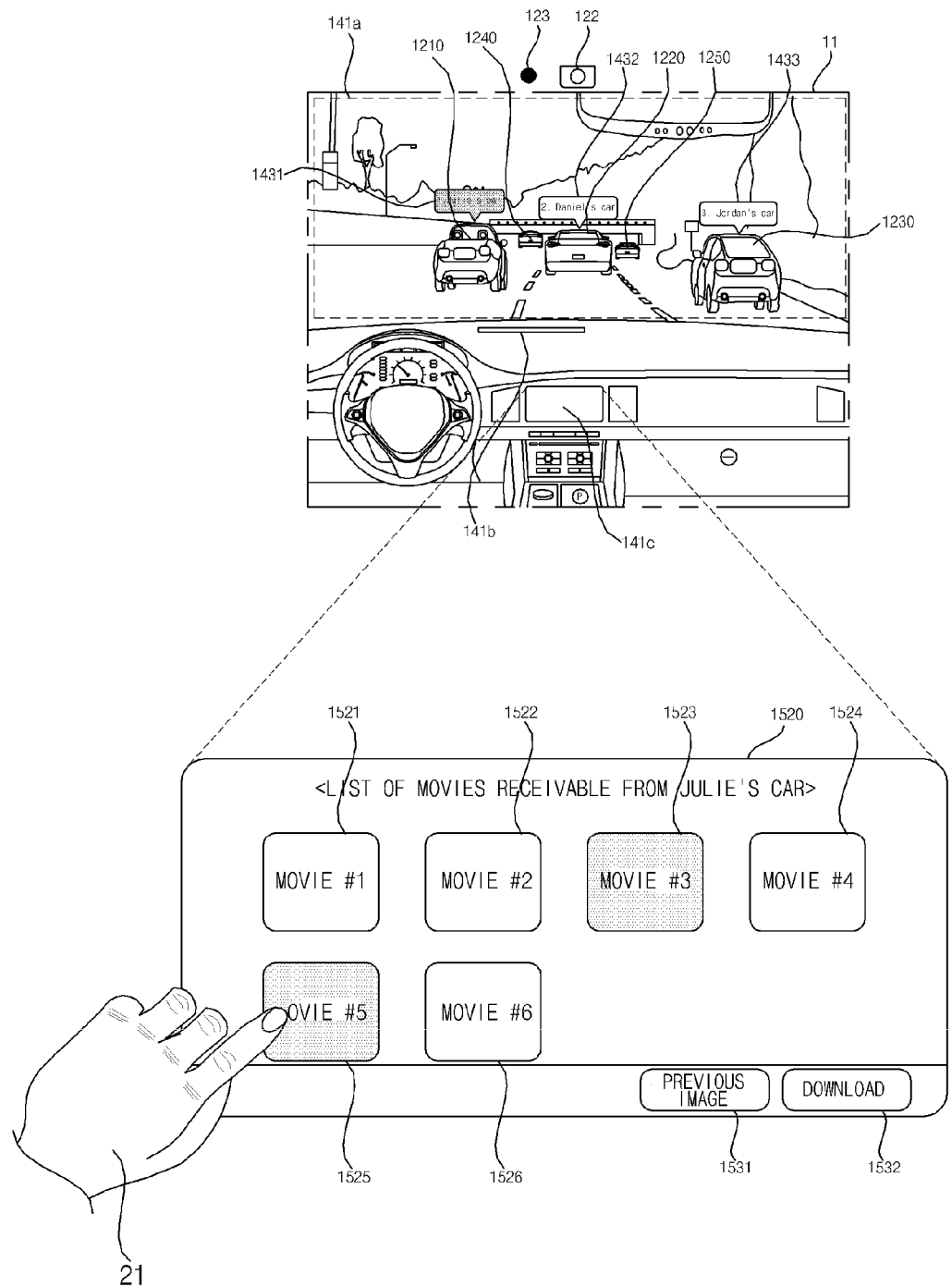

[FIG. 16]
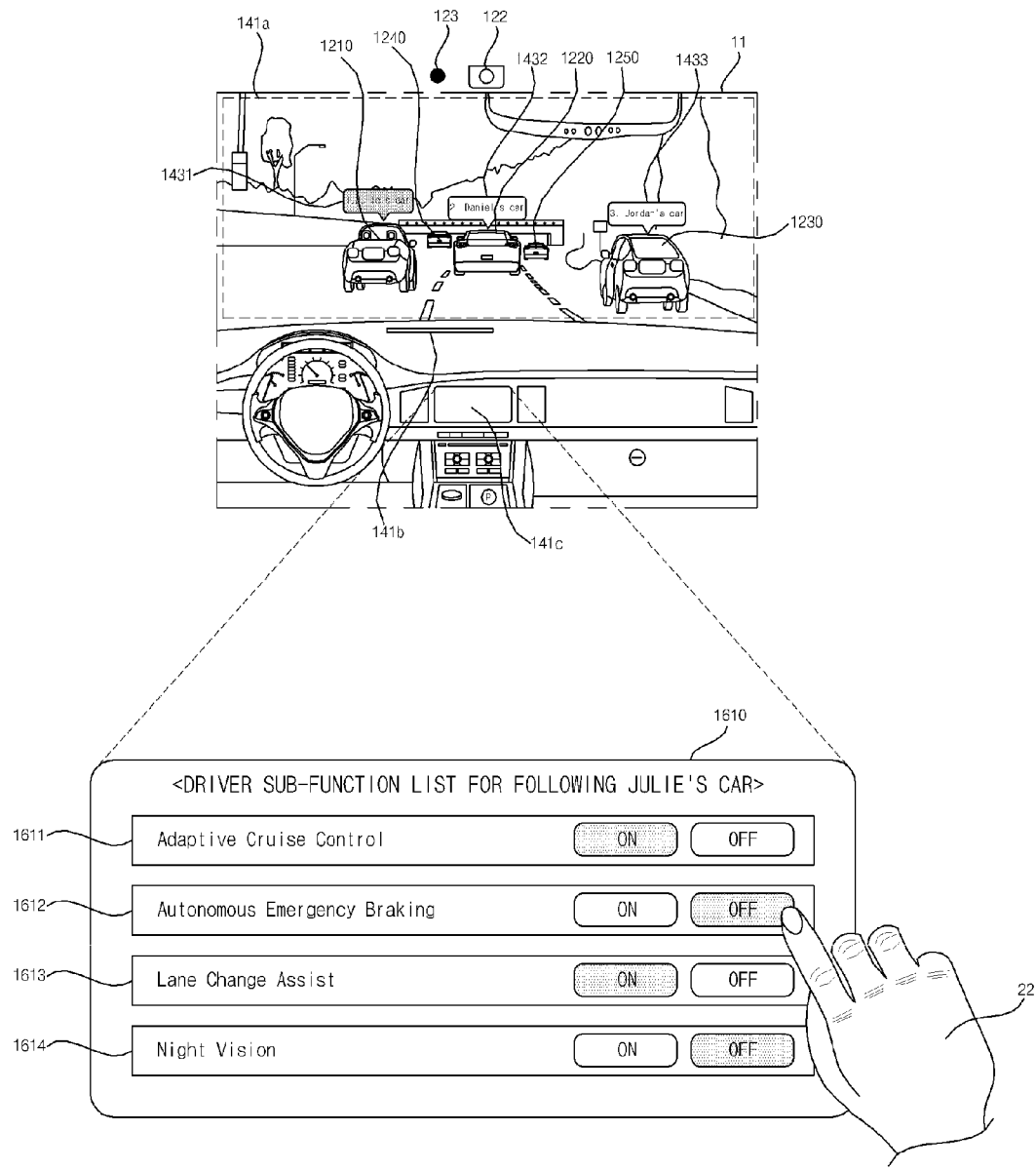

[FIG. 17a]
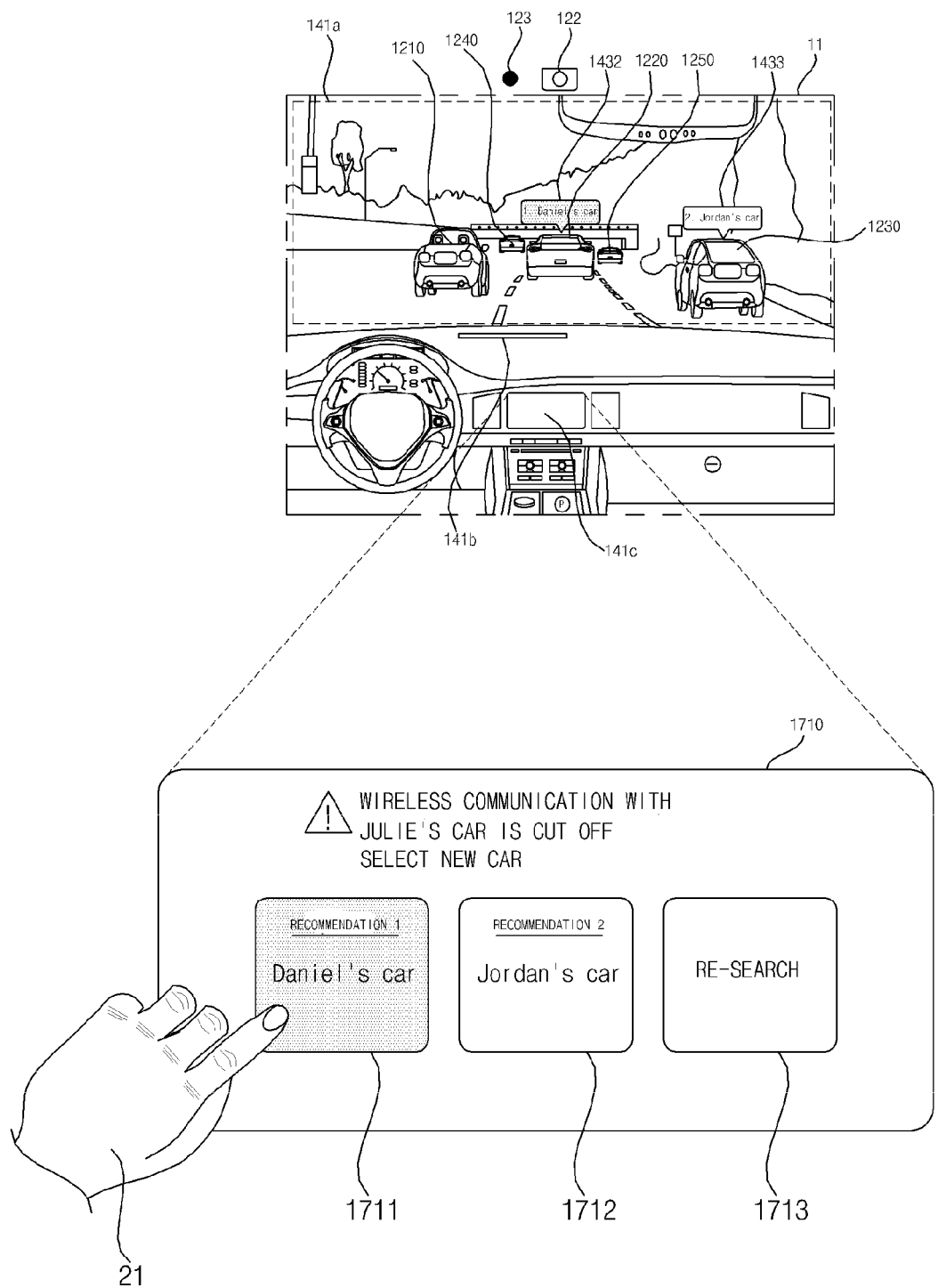

[FIG. 17b]
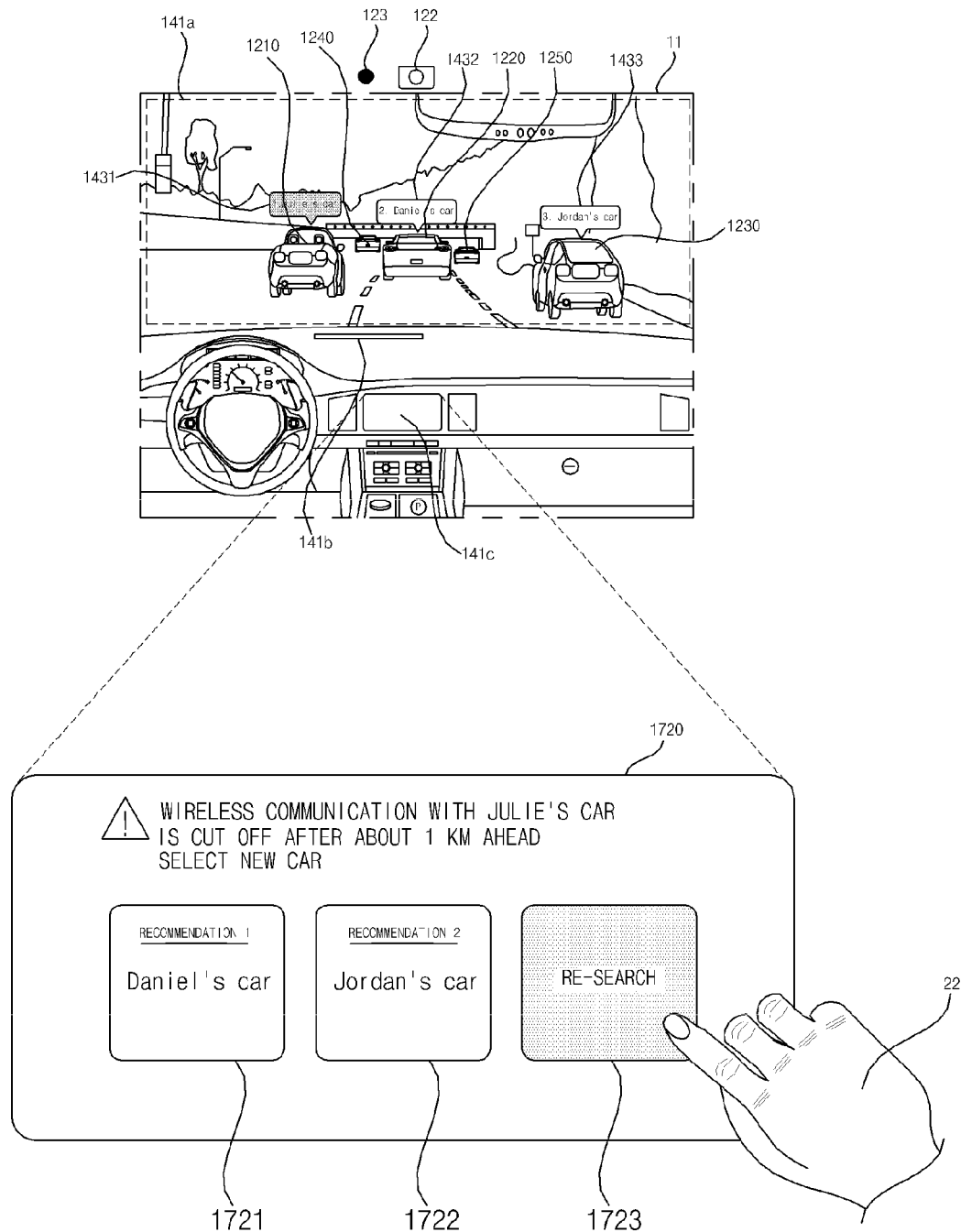

[FIG. 18a]
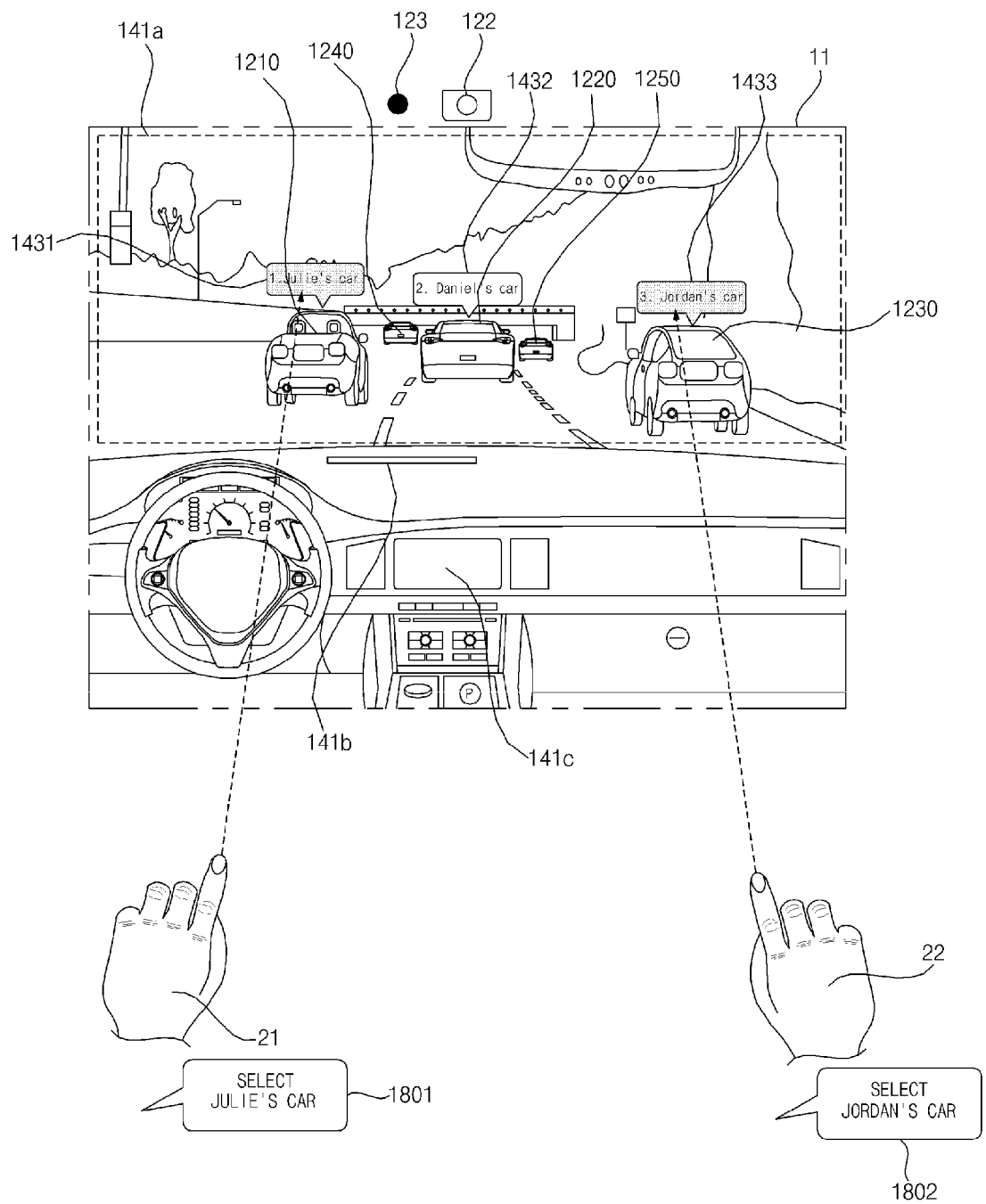

[FIG. 18b]
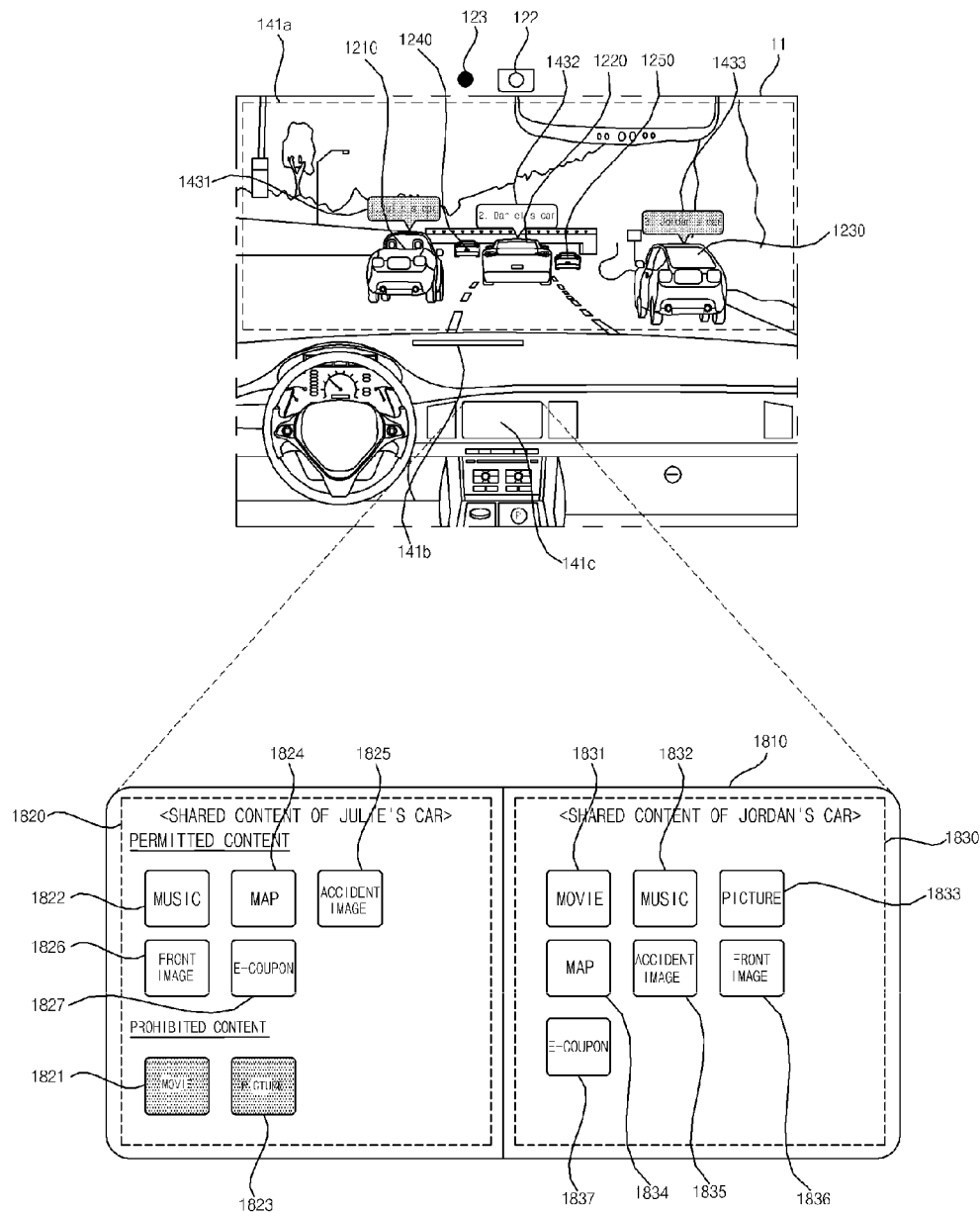

VEHICLE AND CONTROL METHOD THEREOF

CROSS-REFERENCE TO RELATED APPLICATIONS

This application is a National Stage application under 35 U.S.C. § 371 of International Application No. PCT/KR2015/009494, filed Sep. 9, 2015, which claims the benefit of Korean Application No. 10-2015-0123755, filed on Sep. 1, 2015. The disclosures of the prior applications are incorporated by reference in their entirety.

TECHNICAL FIELD

The present invention relates to a vehicle and a control method thereof, and more particularly, to a vehicle for vehicle-to-vehicle communication and a control method thereof.

BACKGROUND ART

Vehicles refer to an apparatus for transporting passengers, freight, etc. from place-to-place by driving vehicle wheels. For example, vehicles include a train, etc. as well as a two-wheel vehicle such as a motorcycle and a four-wheel vehicle such as a sedan.

Development of technology for integrating various sensors, electronic devices, etc. to vehicles has accelerated to enhance safety and convenience of a user who uses a vehicle. In particular, a system for providing various functions (e.g., smart cruise control and lane keeping assistance) that are created for user driving convenience is installed in a vehicle. Accordingly, so-called autonomous driving for allowing a vehicle to autonomously consider an external environment and to drive on a road without driver manipulation is enabled.

Vehicle-to-vehicle communication refers to wireless communication for enabling moving or stationary vehicles to transmit and receive information thereof. Vehicle-to-vehicle communication has been expected to play a large part in preventing accidents, for example, front accident alert or intersection collision prevention.

DISCLOSURE

Technical Problem

An object of the present invention devised to solve the problem lies in a vehicle for receiving content required by a user from other surrounding vehicles and a control method thereof.

It is to be understood that both the foregoing general description and the following detailed description of the present invention are exemplary and explanatory and are intended to provide further explanation of the invention as claimed.

Technical Solution

The object of the present invention can be achieved by providing a vehicle including a display unit, a communication unit configured to wirelessly communicate with an external device, and a controller configured to display a plurality of indicators, respectively corresponding to a plurality of other vehicles that are capable of wirelessly communicating with the vehicle and are retrieved through the communication, on the display unit, each indicator containing identification information of a specific vehicle of the plurality of other vehicles, configured to begin wireless communication with a first other vehicle included in the plurality of other vehicles in response a first user input, and configured to control the display unit to display a user interface for guiding shared contents receivable from the first other vehicle.

Detailed features of other embodiments may be included in the detailed description and drawings.

Advantageous Effects

Effects of a vehicle and a control method thereof according to the present invention will be described below.

According to at least one of embodiments of the present invention, among all other vehicles within a range within which vehicle-to-vehicle communication is possible, only other vehicles that satisfy a search condition determined by a user may be provided as a search result. Accordingly, other vehicles that are not capable of providing content provided by the user may not be retrieved, thereby preventing confusion from being caused to a user.

According to at least one of embodiments of the present invention, priority of other vehicles that are capable of performing vehicle-to-vehicle communication may be determined according to a predetermined standard and may be guided to a user and, accordingly, among all other vehicles contained in the search result, the user may advantageously and easily recognize a vehicle that is most appropriate to the user.

According to at least one of embodiments of the present invention, when a subject who issues a command for receiving specific content is a driver, reception of a specific type of content among content receivable from other vehicles may be blocked. Accordingly, accident danger that may occur when the driver checks content (e.g., movies) that is not related to driving may be lowered.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

FIG. 1 is a block diagram of a vehicle according to an embodiment of the present invention.

FIG. 2 shows an example of the vehicle described with reference to FIG. 1.

FIG. 3 shows an example of the vehicle described with reference to FIG. 1.

FIG. 4 shows examples of images generated by a plurality of cameras shown in FIG. 3.

FIG. 5 is an internal block diagram of a controller shown in FIG. 1.

FIGS. 6A and 6B are diagrams for explanation of an operation of the controller shown in FIG. 5.

FIG. 7 is a flowchart of an exemplary process performed by a vehicle according to an embodiment of the present invention.

FIG. 8 is a flowchart of an exemplary process related to FIG. 7.

FIG. 9 is a flowchart of an exemplary process performed by a vehicle according to an embodiment of the present invention.

FIG. 10 is a flowchart of an exemplary process performed by a vehicle according to an embodiment of the present invention.

FIG. 11 is a flowchart of an exemplary process performed by a vehicle according to an embodiment of the present invention.

FIG. 12 shows an exemplary indoor view of a vehicle according to an embodiment of the present invention.

FIG. 13 shows an exemplary indoor view of a vehicle according to an embodiment of the present invention.

FIGS. 14A to 14D show an exemplary search result provided by a vehicle according to an embodiment of the present invention.

FIGS. 15A and 15B show exemplary user interfaces displayed by a display unit according to an embodiment of the present invention.

FIG. 16 shows an exemplary user interface displayed by a display unit according to an embodiment of the present invention, FIG. 17A shows an exemplary user interface displayed by a display unit according to an embodiment of the present invention.

FIG. 17B shows an exemplary user interface displayed by a display unit according to an embodiment of the present invention.

FIG. 18A shows an exemplary indoor view of a vehicle according to an embodiment of the present invention.

FIG. 18B shows an exemplary indoor view of a vehicle of FIG. 18A.

BEST MODE

Exemplary embodiments of the present invention will be described with reference to the attached drawings. The same reference numerals in the drawings denote like elements, and a repeated explanation thereof will not be given. In addition, the suffixes "module" and "unit" of elements herein are used for convenience of description and thus can be used interchangeably and do not have any distinguishable meanings or functions. Further, in the following description of the at least one embodiment, a detailed description of known functions and configurations incorporated herein will be omitted for the purpose of clarity and for brevity. The features of the present invention will be more clearly understood from the accompanying drawings and should not be limited by the accompanying drawings, and it is to be appreciated that all changes, equivalents, and substitutes that do not depart from the spirit and technical scope of the present invention are encompassed in the present invention.

It will be understood that, although the terms first, second, third etc. may be used herein to describe various elements, these elements should not be limited by these terms. These terms are only used to distinguish one element from another element.

It will be understood that when an element is referred to as being "on", "connected to" or "coupled to" another element, it may be directly on, connected or coupled to the other element or intervening elements may be present. In contrast, when an element is referred to as being "directly on," "directly connected to" or "directly coupled to" another element or layer, there are no intervening elements present. It will be understood that when an element is referred to as "controlling" another element, the element may directly control the other element and may also control the other element through a third element. In addition, it will be understood that when an element is referred to as "providing" information and signals to another element, the element may directly provide information and signals to the other element and may also provide information and signals to the other element through a third element.

Singular expressions in the present specification encompass plural forms thereof unless clearly specified otherwise in context.

Throughout this specification, terms such as "include" and "comprise" may be construed to denote a certain characteristic, number, step, operation, constituent element, or a combination thereof, but may not be construed to exclude the existence of or possibility of addition of one or more other characteristics, numbers, steps, operations, constituent elements, or combinations thereof.

In the specification, the term "vehicle" may be interpreted as an including all of an internal combustion vehicle including an engine as a power source, a hybrid vehicle including an engine and an electric motor as a power source, an electric vehicle including an electric motor as a power source, and so on.

FIG. 1 is a block diagram of a vehicle 1 according to an embodiment of the present invention.

The vehicle 1 may include a communication unit 110, an input unit 120, a memory 130, an output unit 140, a vehicle driver 150, a sensing unit 160, a controller 170, an interface unit 180, and a power supply 190.

The communication unit 110 may include one or more modules for enabling wireless communication between the vehicle 1 and an external device (e.g., a portable terminal, an external server, and other vehicles). The communication unit 110 may include one or more modules for connecting the vehicle 1 to one or more networks.

The communication unit 110 may include a broadcast receiving module 111, a wireless Internet module 112, a short-range communication module 113, a position information module 114, and an optical communication module 115.

The broadcast receiving module 111 may receive a broadcast signal or broadcast related information from an external broadcast management server through a broadcast channel. Here, broadcast includes radio broadcast or television (TV) broadcast.

The wireless Internet module 112 may be a module for access to the wireless Internet and may be installed inside or outside the vehicle 1. The wireless Internet module 112 may be configured to transmit and receive a wireless signal through a communication network based on wireless Internet technologies.

Wireless Internet technologies may include, for example, wireless LAN (WLAN), wireless-fidelity (Wi-Fi), Wi-Fi direct, digital living network alliance (DLNA), wireless broadband (WiBro), world interoperability for microwave access (WiMAX), high speed downlink packet access (HSDPA), high speed uplink packet access (HSUPA), long term evolution (LIE), and long term evolution-advanced (LTE-A) and the wireless Internet module 112 may transmit and receive data according to at least one of any wireless Internet technologies that also include Internet technology that is not listed above. For example, the wireless Internet module 112 may wirelessly exchange data with an external server. The wireless Internet module 112 may receive weather information and road traffic information (e.g., transport protocol expert group (TPEG)) from an external server.

The short-range communication module 113 may be used for short-range communication and may support short-range communication using at least one of Bluetooth™, radio frequency identification (RFID), infrared data association (IrDA), ultra-wideband (UWB), ZigBee, near field communication (NFC), wireless-fidelity (Wi-Fi), Wi-Fi Direct, and Wireless Universal Serial Bus (USB) technologies.

The short-range communication module 113 may form wireless area networks and may perform short-range communication between the vehicle 1 and at least external device. For example, the short-range communication module 113 may wirelessly exchange data with a portable terminal of a passenger. The short-range communication module 113 may receive weather information and road traffic information (e.g., transport protocol expert group (TPEG)) from a portable terminal and an external server. For example, when a user enters the vehicle 1, a portable terminal of the user and the vehicle 1 may be paired automatically or by executing an application by the user.

The position information module 114 may be a module for acquiring a position of the vehicle 1 and may be, as a representative example, a global positioning system (GPS) module. For example, when a vehicle uses a GPS module, the vehicle may acquire a vehicle position using a signal from a GPS satellite.

The optical communication module 115 may include a light emitter and a light receiver.

The light receiver may convert a light signal into an electric signal to receive information. The light receiver may include a photo diode (PD) for receiving light. The PD may convert light into an electric signal. For example, the light receiver may receive information of a front vehicle through light emitted from a light source included in the front vehicle.

The light emitter may include at least one light emitting device for converting an electric signal into an optical signal. Here, the light emitting device may be a light emitting diode (LED). The light emitter may convert an electric signal into an optical signal and may externally transmit the optical signal. For example, the light emitter may externally emit the optical signal by blinking a light emitting device corresponding to a predetermined frequency. In some embodiments, the light emitter may include a plurality of light emitting device arrays. In some embodiments, the light emitter may be integrated into a lamp included in the vehicle 1. For example, the light emitter may be at least one of a head lamp, a taillight, a brake lamp, a turn signal lamp, and a sidelight. For example, the optical communication module 115 may exchange data with another vehicle via optical communication.

The input unit 120 may include a driving manipulation device 121, a microphone 123, and a user input unit 124.

The driving manipulation device 121 may receive a user input for driving the vehicle 1. The driving manipulation device 121 may include a steering input device 121a, a shift input device 121b, an acceleration input device 121c, and a brake input device 121d.

The steering input device 121a may receive a proceeding direction input of the vehicle 1 from the user. The steering input device 121a may include a steering wheel. In some embodiments, the steering input device 121a may be formed as a touchscreen, a touchpad, or a button.

The shift input device 121b may receive an input of parking (P), driving (D), neutral (N), and reverse (R) of the vehicle 1 from the user. The shift input device 121b may take the form of a lever. In some embodiments, the shift input device 121b may be formed as a touchscreen, a touchpad, or a button.

The acceleration input device 121c may receive an input for acceleration of the vehicle 1 from the user. The brake input device 121d may receive an input for deceleration of the vehicle 1 from the user. The acceleration input device 121c and the brake input device 121d may take the form of a pedal. In some embodiments, the acceleration input device 121c or the brake input device 121d may be formed as a touchscreen, a touchpad, or a button.

A camera 122 may be disposed at one side inside the vehicle 1 and may generate an indoor image of the vehicle 1. For example, the camera 122 may be disposed at various parts of the vehicle 1, such as a dashboard surface, a roof surface, and a rear view mirror and may photograph a passenger of the vehicle 1. In this case, the camera 122 may generate an indoor image of an area containing a driver seat of the vehicle 1. The camera 122 may generate an indoor image of an area including a driver seat and a passenger seat of the vehicle 1. The indoor image generated by the camera 122 may be a two-dimensional (2D) image and/or a three-dimensional (3D) image. To generate a 3D image, the camera 122 may include at least one of a stereo camera, a depth camera, and a 3D laser scanner. The camera 122 may provide the indoor image generated thereby to the controller 170 that is functionally combined with the camera 122.

The controller 170 may analyze the indoor image provided by the camera 122 and detect various objects. For example, the controller 170 may detect a gaze and/or gesture of a driver from a part of the indoor image, which corresponds to an area of the driver seat. As another example, the controller 170 may detect a gaze and/or gesture of a passenger from a part of the indoor image, which corresponds to an indoor area except for the area of the driver seat. Needless to say, gazes and/or gestures of the driver and passenger may be simultaneously detected.

The microphone 123 may process an external acoustic signal into electrical data. The processed data may be variously used according to a function performed by the vehicle 1. The microphone 123 may convert a user voice command into electrical data. The converted electrical data may be transmitted to the controller 170.

In some embodiments, the camera 122 or the microphone 123 may be an element included in the sensing unit 160, but not an element included in the input unit 120.

The user input unit 124 may receive information from the user. Upon receiving information through the user input unit 124, the controller 170 may control an operation of the vehicle 1 to correspond to the received information. The user input unit 124 may include a touch-type input device or a machine-type input device. In some embodiments, the user input unit 124 may be disposed at one side of the steering wheel. In this case, the driver may manipulate the user input unit 124 with their fingers while holding the steering wheel.

The input unit 120 may include a plurality of buttons or touch sensors. Through the plurality of buttons or touch sensors, various input operations may be performed.

The sensing unit 160 may sense signals related to driving of the vehicle 1, and so on. To this end, the sensing unit 160 may include a crash sensor, a steering sensor, a speed sensor, an inclination sensor, a weight detection sensor, a heading sensor, a yaw sensor, a gyro sensor, a position module, a vehicle front/rear sensor, a battery sensor, a fuel sensor, a tire sensor, a steering sensor based on handle rotation, a vehicle internal temperature sensor, a vehicle internal humidity sensor, an ultrasonic sensor, an infrared sensor, a radar, a light detection and ranging (lidar), and so on.

Thereby, the sensing unit 160 may acquire a sensing signal of vehicle crash information, vehicle direction information, vehicle position information (GPS information), vehicle angle information, vehicle speed information, vehicle acceleration information, vehicle inclination information, vehicle forward/backward driving information, battery information, fuel information, tire information, vehicle lamp information, vehicle internal temperature information, vehicle internal humidity information, a rotation angle of a steering wheel, and so on. The controller 170 may generate a control signal for acceleration, deceleration, direction change, etc. of the vehicle 1 based on external environment information acquired by at least one of a camera, an ultrasonic sensor, an infrared sensor, a radar, and a lidar, included in the vehicle 1. Here, the external environment information may be information related to various objects positioned in a predetermined distance range from the vehicle 1 that is currently driven. For example, the external environment information may include information on the number of obstacles positioned within 100 m from the vehicle 1, a distance to the obstacle, a size of the obstacle, a type of the obstacle, and so on.

The sensing unit 160 may further include an acceleration pedal sensor, a pressure sensor, an engine speed sensor, an air flow sensor (AFS), an air temperature sensor (ATS), a water temperature sensor (WTS), a throttle position sensor (TPS), a top dead center (TDC) sensor, a crank angle sensor (CAS), and so on.

The sensing unit 160 may include a biometric information detector. The biometric information detector may detect and acquire biometric information of a passenger. The biometric information may include fingerprint information, iris-scan information, retina-scan information, hand geometry information, facial recognition information, and voice recognition information. The biometric information detector may include a sensor for sensing biometric information of the passenger. Here, the camera 122 and the microphone 123 may operate as a sensor. The biometric information detector may acquire hand geometry information and facial recognition information through the camera 122.

The sensing unit 160 may include at least one camera 161 for photographing an outer part of the vehicle 2. The camera 161 may be referred to as an external camera. For example, the sensing unit 160 may include a plurality of cameras 161 arranged at different positions of the outer part of the vehicle. The camera 161 may include an image sensor and an image processing module. The camera 161 may process a still image or video image acquired by an image sensor (e.g., CMOS or CCD). The image processing module may process the still image or video image acquired by the image sensor to extract required information and transmit the extracted information to the controller 170.

The camera 161 may include an image sensor (e.g., CMOS or CCD) and an image processing module. The camera 161 may process the still image or video image acquired by the image sensor. The image processing module may process the still image or video image acquired by the image sensor. The camera 161 may acquire an image containing at least one of a traffic light, a traffic sign board, a pedestrian, another vehicle, and a road.

The output unit 140 may be used to output information processed by the controller 170 and may include a display unit 141, a sound output unit 142, and a haptic output unit 143.

The display unit 141 may display information processed by the controller 170. For example, the display unit 141 may display vehicle related information. Here, the vehicle related information may include vehicle control information for direct control of a vehicle or vehicle driving assistance information for providing driving guidance to a vehicle driver. The vehicle related information may include vehicle state information indicating a current state of a vehicle or vehicle driving information related to vehicle driving.

The display unit 141 may include at least one of a liquid crystal display (LCD), a thin film transistor-liquid crystal display (TFT LCD), an organic light-emitting diode (OLED), a flexible display, a 3D display, and an e-ink display.

The display unit 141 may form an interlayer structure with a touch sensor or may be integrated into the touch sensor so as to constitute a touchscreen. The touchscreen may function as the user input unit 124 for providing an input interface between the vehicle 1 and the user and, simultaneously, may provide an output interface between the vehicle 1 and the user. In this case, the display unit 141 may include a touch sensor for detecting touching of the display unit 141 so as to receive a control command using a touch method. When the display unit 141 is touched using the touch sensor, the touch sensor may detect the touch and the controller 170 may generate a control command corresponding to the touch based on the touch result. Content input using, the touch method may be letters or numbers, commands in various modes, a selectable menu item, or the like.

The display unit 141 may include a cluster for allowing a driver to check vehicle state information or vehicle driving information while driving a vehicle. The cluster may be positioned on a dashboard. In this case, the driver may check information displayed on the cluster while looking forward.

In some embodiments, the display unit 141 may be embodied as a head up display (HUD). When the display unit 141 is embodied as a HUD, the display unit 141 may output information through a transparent display included in a windshield. The display unit 141 may include a projection module and may output information as an image projected on the windshield.

The sound output unit 142 may convert an electric signal from the controller 170 into an audio signal and output the audio signal. To this end, the sound output unit 142 may include a speaker, and so on. The sound output unit 142 may output sound corresponding to an operation of the user input unit 124.

The haptic output unit 143 may generate a tactile output. For example, the haptic output unit 143 may vibrate a steering wheel, a seat belt, and a seat to allow the user to recognize the output.

The vehicle driver 150 may control operations of various apparatuses of a vehicle. The vehicle driver 150 may include at least one of a power source driver 151, a steering driver 152, a brake driver 153, a lamp driver 154, an air conditioning driver 155, a window driver 156, an airbag driver 157, a sunroof driver 158, and a wiper driver 159.

The power source driver 151 may perform electronic control on a power source in the vehicle 1. The power source driver 151 may include an acceleration apparatus for increasing speed of the vehicle 1 and a deceleration apparatus for reducing speed of the vehicle 1.

For example, when a fossil fuel-based engine (not shown) is a power source, the power source driver 151 may perform electronic control of the engine. Thereby, output torque, etc. of the engine may be controlled. When the power source driver 151 is an engine, engine output torque may be limited to restrict vehicle speed according to control of the controller 17.

As another example, when an electricity-based motor (not shown) is a power source, the power source driver 151 may control the motor. Thereby, rotational speed, torque, etc. of the motor may be controlled.

The steering driver 152 may include a steering apparatus. Accordingly, the steeling driver 152 may perform electronic control on a steering apparatus in the vehicle 1. For example, the steering driver 152 may include a steering torque sensor, a steering angle sensor, and a steering motor and steering torque that is applied to the steering wheel by the driver may be detected by a steering torque sensor. The steering driver 152 may change the amplitude and direction of current applied to the steering motor based on speed, steering torque, etc. of the vehicle 1 to control steering force and a steering angle. The steering driver 152 may determine whether a driving direction of the vehicle 1 is appropriately adjusted based on the steering angle information acquired by the steering angle sensor. Thereby, the driving direction of the vehicle may be changed. The steering driver 152 may increase steering force of a steering motor to reduce weight feeling of a steering wheel while the vehicle 1 is driven at low speed and may reduce steering force of the steering motor to increase weight feeling of the steering wheel while the vehicle 1 is driven at high speed. When an autonomous driving function of the vehicle 1 is executed, the steering driver 152 may control the steering motor to generate appropriate steering force based on a sensing signal output by the sensing unit 160 or a control signal, etc. provided by the controller 170 even when a driver manipulates the steering wheel (e.g., when steering torque is not detected).

The brake driver 153 may perform electronic control on a brake apparatus (not shown) in the vehicle 1. For example, an operation of a brake disposed at a wheel may be controlled to reduce speed of the vehicle 1. As another example, operations of brakes that are arranged at left and right wheels, respectively, may be changed to adjust a proceeding direction of the vehicle 1 to a the left or right.

The lamp driver 154 may control on/off of at least one of lamps arranged inside and outside a vehicle. The lamp driver 154 may include an illumination apparatus. The lamp driver 154 may control intensity, direction, etc. of light emitted from each lamp included in the illumination apparatus. For example, the lamp driver 154 may control a turn signal lamp, a head lamp, a brake lamp, and so on.

The air conditioning driver 155 may perform electronic control on an air conditioner (not shown) in the vehicle 1. For example, when the temperature in a vehicle is high, the air conditioning driver 155 may control the air conditioner to supply cool air into the vehicle.

The window driver 156 may perform electronic control on a window apparatus in the vehicle 1. For example, the window driver 156 may control opening or closing of left and right windows of the vehicle.

The airbag driver 157 may perform electronic control on an airbag apparatus in the vehicle 1. For example, the airbag driver 157 may deploy an airbag in the event of an accident.

The sunroof driver 158 may perform electronic control on a sunroof apparatus (not shown) in the vehicle 1. For example, the sunroof driver 158 may control opening or closing of the sunroof apparatus.

The wiper driver 159 may control wipers 14a and 14b included in the vehicle 1. For example, upon receiving a user input for issuing a command for driving a wiper through the user input unit 124, the wiper driver 159 may perform electronic control on a driving number of times, driving speed, and so on of the wipers 14a and 14b in response to the user input. As another example, the wiper driver 159 may determine the amount or intensity of rainwater based on a sensing signal of a rain sensor included in the sensing unit 160 and may automatically drive the wipers 14a and 14b without a user input.

The vehicle driver 150 may further include a suspension driver (not shown). The suspension driver may perform electronic control on a suspension apparatus (not shown) in the vehicle 1. For example, when a road surface is uneven, the vehicle driver 150 may control the suspension apparatus to reduce vibration of the vehicle 1.

The memory 130 may be electrically connected to the controller 170. The memory 170 may store basic data of a unit, control data for control of an operation of the unit, and input and output data. The memory 190 may be various storage devices such as a ROM, a RAM, an EPROM, a flash drive, and a hard drive in terms of hardware. The memory 130 may store various data for an overall operation of the vehicle 1, such as a program for processing or controlling the controller 170.

The interface unit 180 may function as a path to various types of external apparatuses connected to the vehicle 1. For example, the interface unit 180 may include a port that is connectable to a portable terminal and may be connected to the portable terminal through the port. In this case, the interface unit 180 may exchange data with the portable terminal.

The interface unit 180 may receive turn-signal information. Here, the turn-signal information may be a turn-on signal of a turn signal lamp for left or right turn, input by a user. Upon receiving a turn-on input of the turn signal lamp for left or right turn through a user input unit 724 (refer to FIG. 6) of a vehicle, the interface unit 180 may receive the turn-signal information of a left or right direction.

The interface unit 180 may receive vehicle speed information, rotation angle information of the steering wheel, or gear shift information. The interface unit 180 may receive vehicle speed information, steering wheel rotation angle information, or gear shift information, which is sensed through the sensing unit 160 of the vehicle. The interface unit 180 may receive the vehicle speed information, the steering wheel rotation angle information, or the gear shift information from the controller 170 of the vehicle. Here, the gear shift information may be information on a current state of a shifter of the vehicle. For example, the gear shift information may be information on a current state of the shifter among parking (P), reverse (R), neutral (N), driving (D), and first to multi-stage gear states.

The interface unit 180 may receive user input received through the user input unit 124 of the vehicle 1. The interface unit 180 may receive user input from the input unit 120 of the vehicle 1 or receive user input through the controller 170.

The interface unit 180 may receive information acquired from an external apparatus. For example, upon receiving traffic light change information from an external server through the communication unit 110 of the vehicle 1, the interface unit 180 may receive the traffic light change information from the controller 170.

The controller 170 may control an overall operation of each unit in the vehicle 1. The controller 170 may be referred to as an electronic control unit (ECU).

The controller 170 may be embodied as at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and electrical units for performing other functions, in terms of hardware.

The power supply 190 may supply power required for operations of elements according to control of the controller 170. In particular, the power supply 170 may receive power from a battery (not shown) inside a vehicle.

An audio video navigation (AVN) apparatus 400 may exchange data with the controller 170. The controller 170 may receive navigation information from an AVN apparatus or a separate navigation apparatus. Here, the navigation information may include information on a set destination, path information based on the destination, or map information or vehicle position information related to vehicle driving.

Some of the components shown in FIG. 1 may not be required to embody the vehicle 1. Accordingly, the vehicle 1 described in this specification may include greater or fewer components than the above-listed components.

FIG. 2 shows an example of the vehicle 1 that has been described with reference to FIG. 1. For convenience of description, the vehicle 1 may be assumed to be a four-wheel vehicle.

Referring to FIG. 2, the vehicle 1 may include at least one radar 201, a lidar 202, and an ultrasonic sensor 203.

The radar 201 may be installed at one side of the vehicle 1, may emit electromagnetic waves toward around the vehicle 1, and may receive electromagnetic waves reflected by various objects present around the vehicle 1. For example, the radar 201 may measure a time taken to reflecting electromagnetic waves by an object back to the radar 201 to acquire information related to a distance, direction, altitude, and so on of the corresponding object.

The lidar 202 may be installed at one side of the vehicle 1 and may emit a laser beam toward around the vehicle 1. The laser beam emitted by the lidar 202 may be scattered or reflected back to the vehicle 1 and the lidar 202 may acquire information on physical properties such as a distance, speed, shape, etc. of a target positioned around the vehicle 1 based on a returning time of a laser beam, intensity of the laser beam, change in frequency, and a polarization state.

The ultrasonic sensor 203 may be installed at one side of the vehicle 1 and may generate ultrasonic waves toward around the vehicle 1. The ultrasonic waves generated by the ultrasonic sensor 203 may have characteristics of a high frequency (about 20 KHz or greater) and a short wavelength. The ultrasonic sensor 203 may be mainly used to recognize an obstacle, etc. adjacent to the vehicle 1.

The radar 201, the lidar 202, and the ultrasonic sensor 203 shown in FIG. 2 may be sensors included in the sensing unit 160 shown in FIG. 1.

Referring to FIG. 3, four cameras 161*a*, 161*b*, 161*c*, and 161*d* may be installed on different parts of an external part of the vehicle 1. The four cameras 161*a*, 161*b*, 161*c*, and 161*d* may be included in the camera 160 (refer to FIG. 1A).

The plurality of cameras 161*a*, 161*b*, 161*c*, and 161*d* may be arranged at front, left, right, and rear sides of the vehicle 1, respectively. Each of the plurality of cameras 161*a*, 161*b*, 161*c*, and 161*d* may be included in the camera 161 shown in FIG. 1A.

The front camera 161*a* may be arranged around a windshield, an emblem, or a radiator grill.

The left camera 161*b* may be arranged in a case surrounding a left side mirror. Alternatively, the left camera 161*b* may be arranged outside the case surrounding the left side mirror. Alternatively, the left camera 161*b* may be arranged at one side of an external part of a left front door, a left rear door, or a left fender.

The right camera 161*c* may be arranged in a case surrounding a right side mirror. Alternatively, the right camera 161*c* may be arranged outside the case surrounding the right side mirror. Alternatively, the right camera 161*c* may be arranged at one side of an external part of a right front door, a right rear door, or a right fender.

The rear camera 161*d* may be arranged around a rear number board or a trunk switch.

Images captured by the plurality of cameras 161*a*, 161*b*, 161*c*, and 161*d* may be transmitted to the controller 170 and the controller 170 may compose the images to generate a vehicle vicinity image.

The plurality of cameras 161*a*, 161*b*, 161*c*, and 161*d* shown in FIG. 3 may be the same as the camera 161 of the sensing unit 160 shown in FIG. 1A.

Although FIG. 3 illustrates the case in which four cameras are installed on an external part of the vehicle 1, the present invention may not be limited to the number of cameras and, accordingly, greater or fewer cameras may be installed on different positions from in FIG. 3.

FIG. 4 shows examples of images generated by the plurality of cameras 161*a*, 161*b*, 161*c*, and 161*d* shown in FIG. 3.

Referring to FIG. 4, a composite image 400 may include a first image region 401 corresponding to an external image captured by the front camera 161*a*, a second image region 402 corresponding to an external image captured by the left camera 161*b*, a third image region 403 corresponding to an external image captured by the right camera 161*c*, and a fourth image region 404 corresponding to an external image captured by the rear camera 161*d*. The composite image 400 may be referred to as an around view monitoring image.

When the composite image 400 is generated, boundary lines 411, 412, 413, and 414 between any two of the external images included in the composite image 400 may be generated. Image-blending processing may be performed on these boundary parts to smoothly display the image.

The boundary lines 411, 412, 413, and 414 may be displayed at boundaries of a plurality of images. A preset image indicating the vehicle 1 may be contained in a central part of the composite image 400.

The composite image 400 may be displayed on a display apparatus installed inside the vehicle 1.

The controller 170 may signal-process the image received from the cameras 161 and 122 shown in FIG. 1 based on a computer vision to generate vehicle related information. Here, the vehicle related information may include vehicle control information for direct control of a vehicle or vehicle driving assistance information for driving guidance to a vehicle driver. Here, the camera 161 may include at least one of a mono camera, a stereo camera, and a depth camera.

The memory 130 may store programs and various data for processing or control of the controller 170.

The memory 130 may store data for verifying an object. For example, upon detecting a predetermined object from an image acquired through the cameras 161 and 122, the memory 130 may store data for verifying the object using a predetermined algorithm.

The memory 130 may store data of traffic information. For example, upon detecting predetermined traffic information from the external image acquired through the camera 161, the memory 130 may store data for verifying the traffic information using a predetermined algorithm.

The memory 130 may be various storage devices such as a ROM, a RAM, an EPROM, a flash drive, and a hard drive.

The controller 170 may process a vehicle front image or vehicle vicinity image acquired by the camera 161. In particular, the controller 170 may perform signal-processing based on a computer vision. Accordingly, the controller 170 may acquire the vehicle front image or the vehicle vicinity image from the camera 161 and perform object detection and object tracking based on the image. In particular, the controller 170 may perform lane detection (LD), vehicle detection (VD), pedestrian detection (PD), brightspot detection (BD), traffic sign recognition (TSR), road surface detection, and so on when detecting an object.

A traffic sign may refer to predetermined information to be transmitted to a driver of the vehicle 1. The traffic sign may be transmitted to the driver through a traffic light, a traffic sign board, or a road surface. For example, the traffic sign may be a go or stop sign of a vehicle or pedestrian, output from the traffic light. For example, the traffic sign may be various designs or texts indicated on a traffic sign board. For example, the traffic sign may be various designs or texts indicated on a road surface.

The controller 170 may detect information from the vehicle vicinity image generated by the camera 161.

The information may be related to a vehicle driving situation. For example, the information may be interpreted as including road information of a driving vehicle, traffic rule information, surrounding vehicle information, vehicle or pedestrian traffic light information, construction information, traffic situation information, parking lot information, lane information, and so on.

The information may be traffic information. The controller 170 may detect traffic information from any one of a traffic light, a traffic sign board, and a road surface, contained in the external image acquired by the camera 161. For example, the controller 170 may detect a go or stop sign of a vehicle or pedestrian from a traffic light contained in an image. For example, the controller 170 may detect various or texts from a traffic sign board contained in an image. For example, the controller 170 may detect various or texts from a road surface contained in the image.

The controller 170 may compare the detected information with information stored in the memory 130 to verify information.

For example, the controller 170 may detect a design or text indicating a rampway from an object included in the acquired image. Here, the object may be a traffic sign board or a road surface. A design or a text may be detected. The controller 170 may compare the traffic information stored in the memory 130 and the detected design or text to verify rampway information.

For example, the controller 170 may detect a design or text indicating vehicle or pedestrian stop from an object contained in the acquired image. Here, the object may be a traffic sign board or a road surface. The controller 170 may compare the traffic information stored in the memory 130 and the detected design or text to verify stop information. In addition, the controller 170 may detect a stop line from a road surface contained in the acquired image. The controller 170 may compare the traffic information stored in the memory 130 and the stop line to verify stop information.

For example, the controller 170 may detect whether a lane is present in an object contained in the acquired image. Here, the object may be a road surface. The controller 170 may check color of the detected lane. The controller 170 may check whether the detected lane is a driving lane or a standby lane.

For example, the controller 170 may detect go or stop information of a vehicle from an object contained in the acquired image. Here, the object may be a vehicle traffic light. Here, the go information of the vehicle may be a sign indicating go straight, left turn, or right turn. The stop information of the vehicle may be a sign indicating vehicle stop. The go information of the vehicle may be indicated by green and the stop information of the vehicle may be indicated by red.

For example, the controller 170 may detect go or stop information of a pedestrian from an object contained in the acquired image. Here, the object may be a pedestrian traffic light. Here, the go information of the pedestrian may be a sign for permitting the pedestrian to cross the street at a crosswalk. The stop information of the pedestrian may be a sign for letting the pedestrian to stop at a crosswalk.

The controller 170 may control zoom of the cameras 161 and 122. For example, the controller 170 may control zoom of the camera 161 according to the detection result of an object. For example, even if a traffic sign board is detected but information indicated on the traffic sign board is not detected, the controller 170 may control the camera 161 to zoom-in.

The controller 170 may receive weather information and road traffic information, for example, transport protocol expert group (TPEG) information through the communication unit 110.

The controller 170 may recognize vehicle surrounding situation information (e.g., traffic information, accident information, road state information, and obstacle information) in real time or periodically based on the external image provided from the camera 161. The controller 170 may recognize information on indoor situation information (e.g., a driver state and a passenger gesture) of the vehicle in real time or periodically based on the indoor image provided from the camera 122.

The controller 170 may receive navigation information, etc. from an AVN apparatus or a separate navigation apparatus through the interface unit 180.

The controller 170 may receive sensor information from the controller 170 or the sensing unit 160 through the interface unit 180. Here, the sensor information may include at least one of vehicle direction information, vehicle position information (GPS information), vehicle angle information, vehicle speed information, vehicle acceleration information, vehicle inclination information, vehicle forward/backward driving information, battery information, fuel information, tire information, vehicle lamp information, vehicle internal temperature information, vehicle internal humidity information, and steering wheel rotation information.

The controller 170 may receive navigation information from the controller 170, an AVN apparatus, or a separate navigation apparatus through the interface unit 180.

The controller 170 may be embodied using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and electrical units for performing other functions.

The display unit 141 may display various pieces of information processed by the controller 170. The display unit 141 may display an image related to an operation of the vehicle 1. To display the image, the display unit 141 may include a cluster or a head up display (HDU), positioned on a front surface of the vehicle. When the display unit 141 is a HUD, the 141 may include a projection module for projecting an image to a front glass of the vehicle 1.

The power supply 190 may supply power required for operations of the components according to control of the controller 170. In particular, the power supply 190 may receive power from a battery, etc. inside the vehicle 1.

FIG. 5 is an internal block diagram of the controller 170 shown in FIG. 1.

Referring to FIG. 5, the controller 170 may include an image preprocessor 510, a disparity calculator 520, an object detector 534, an object tracking unit 540, and an application unit 550.

The image preprocessor 510 may receive the image provided from the cameras 161 and 122 shown in FIG. 1 and perform preprocessing on the image.

In detail, the image preprocessor 510 may perform noise reduction, rectification, calibration, color enhancement, color space conversion (CSC), interpolation, camera gain control, and the like on the image. Accordingly, a clearer image than a stereo image captured by the cameras 161 and 122 may be acquired.

The disparity calculator 520 may receive images that are signal-processed by the image preprocessor 510 and perform stereo matching on the received images to acquire a disparity map according to stereo matching. That is, the disparity information of the stereo image of a front part of a vehicle may be acquired.

In this case, stereo matching may be performed in units of pixels or predetermined blocks of stereo images. The disparity map may refer to a map numerically indicating a stereo image, i.e., binocular parallax information of left and right images.

A segmentation unit 532 may perform segment and clustering on at least one of the images based on the disparity information from the disparity calculator 520.

In detail, the segmentation unit 532 may divide at least one of the stereo images into a background and a foreground based on the disparity information.

For example, a region in the disparity map, disparity information of which is equal to or less than a predetermined value, may be calculated as a background and the corresponding region may be excluded. Accordingly, relatively, the foreground may be extracted.

As another example, a region in the disparity map, disparity information of which is greater than or equal to a predetermined value, may be calculated as a foreground and the corresponding region may be extracted. Accordingly, the foreground may be extracted.

As such, the foreground and the background may be separated based on the disparity information extracted based on stereo image so as to reduce signal processing speed, a signal processing amount, etc. in a next operation of detecting an object.

Then, the object detector 534 may detect an object based on image segment from the segmentation unit 532.

That is, the object detector 534 may detect an object from at least one of the images based on the disparity information.

In detail, the object detector 534 may detect an object from at least one of the images. For example, the object may be detected from the foreground separated via image segment.

Then, the object verification unit 536 may classify and verify the separated object.

To this end, an object verification unit 536 may use a verification scheme using a neural network, a support vector machine (SVM) scheme, a verification scheme via AdaBoost using Haar-like characteristics, histograms of oriented gradients (HOG) scheme, or the like.

The object verification unit 536 may compare the objects stored in the memory 130 and the detected object to verify an object.

For example, the object verification unit 536 may verify a surrounding vehicle, a lane, a road surface, a sign board, a danger zone, a tunnel, etc. positioned around the vehicle.

The object tracking unit 540 may perform tracking on the verified object. For example, sequentially, an object in the acquired stereo images may be verified, a motion or motion vector of the verified object may be calculated, and movement of the corresponding object may be tracked based on the calculated motion or motion vector. Accordingly, a surrounding vehicle, a lane, a road surface, a sign board, a danger zone, a tunnel, etc. positioned around the vehicle may be tracked.

Then, the application unit 550 may calculate a degree of risk, etc. of the vehicle 1 based on various objects (e.g., other vehicles, a lane, a road surface, and a sign board) positioned around the vehicle 1. Possibility of crash with a front vehicle, whether a vehicle slips, and so on may be calculated.

The application unit 550 may output a message, etc. for indicating information as vehicle driving assistance information to a user based on the calculated degree of risk, crash possibility, whether a vehicle slips, etc. In addition, the application unit 550 may generate a control signal for gesture control or driving control of the vehicle 1 as vehicle control information.

In some embodiments, the controller 170 may include only some of the image preprocessor 510, the segmentation unit 532, the object detector 534, the object verification unit 536, the object tracking unit 540, and the application unit 550. For example, when the cameras 161 and 122 are a camera for providing only a 2D image, the disparity calculator 520 may be excluded.

FIGS. 6A and 6B are diagrams for explanation of an operation of the controller 170 shown in FIG. 5.

FIGS. 6A and 6B are diagrams for explanation of a method of operating the controller 170 of FIG. 5 based on stereo images that are acquired in first and second frame sections, respectively.

First, referring to FIG. 6A, when the camera 161 is a stereo camera, the camera 161 may acquire a stereo image during the first frame section.

The disparity calculator 520 in the controller 170 may receive stereo images FR1a and FR1b that are signal-processed by the image preprocessor 510 and may perform stereo matching on the received stereo images FR1a and FR1b to acquire a disparity map 620.

The disparity map 620 may be formed by leveling binocular parallax between the stereo images FR1a and FR1b and may be calculated in such a way that, as a disparity level is increased, a distance from a vehicle is closer and, as a disparity level is reduced, a distance from the vehicle is farther.

When the disparity map is displayed, the disparity map may be displayed in such a way that, a disparity level is increased, brightness is higher and, as a disparity level is reduced, brightness is lower.

The drawing illustrates an example in which, in the disparity map 620, first to fourth lanes 628a, 628b, 628c, and 628d, etc. have respective corresponding disparity levels and a construction zone 622, a first front vehicle 624, and a second front vehicle 626 have respective corresponding disparity levels.

The segmentation unit 532, the object detector 534, and the object verification unit 536 may perform segment, object detection, and object verification on at least one of the stereo images FR1a and FR1b based on the disparity map 620.

The drawing illustrates an example in which object detection and verification are performed on the second stereo image FR1b using the disparity map 620.

That is, object detection and verification may be performed on first to fourth lanes 638a, 638b, 638c, and 638d, a construction zone 632, a first front vehicle 634, and a second front vehicle 636 in an image 630.

Then, referring to FIG. 6B, the stereo camera 161 may capture a stereo image during the second frame section.

The disparity calculator 520 in the controller 170 may receive stereo images FR2a and FR2b that are signal-processed by the image preprocessor 510 and may perform stereo matching on the received stereo images FR2a and FR2b to acquire a disparity map 640.

The drawing illustrates an example in which, in the disparity map 640, first to fourth lanes 648a, 648b, 648c, and 648d, etc. have respective corresponding disparity levels and a construction zone 642, a first front vehicle 644, and a second front vehicle 646 have respective corresponding disparity levels.

The segmentation unit 532와 the object detector 534, and the object verification unit 536 may perform segment, object detection, and object verification on at least one of the stereo images FR2a and FR2b based on the disparity map 640.

The drawing illustrates an example in which object detection and verification are performed on the second stereo image FR2b using the disparity map 640.

That is, object detection and verification may be performed on first to fourth lanes 658a, 658b, 658c, and 658d, a construction zone 652, a first front vehicle 654, and a second front vehicle 656 in an image 650.

The object tracking unit 540 may compare FIGS. 6A and 6B and may track the verified object.

In detail, the object tracking unit 540 may track movement, etc. of a corresponding object based on the motion or motion vector of each of the objects verified in FIGS. 6A and 6B. Accordingly, the object tracking unit 540 may track a lane, a construction zone, a first front vehicle, a second front vehicle, etc. positioned around a vehicle.

FIG. 7 is a flowchart of an exemplary process S700 performed by the vehicle 1 according to an embodiment of the present invention.

In operation S710, the communication unit 110 of the vehicle 1 may search for other vehicles positioned around the vehicle 1. In detail, the communication unit 110 may search for presence of at least one of other vehicles that are capable of wirelessly communicating with the vehicle 1 among various external devices positioned around the vehicle 1. That is, the vehicle 1 may search for at least one of other vehicles that are capable of performing vehicle-to-vehicle communication (V2V) with the vehicle 1. Vehicle-to-vehicle communication (V2V) refers to transmission and reception of various pieces of information (e.g., speed, a direction, a brake, a position, engine output, a turn signal, and a state of a wiper) between a vehicle and at least one other vehicle using a wireless communication unit installed in each vehicle. Since vehicle-to-vehicle communication (V2V) actively transmits and receives information through a wireless communication network formed between vehicles, observation to several hundreds of meters is possible and, thus, a driver may more actively manage risk than in the case in which a typical sensor, etc. are used. In this case, the communication unit 110 may search for an external device (e.g., a portable device) therewith as well as other vehicles.

Surrounding of the vehicle 1 may refer to a region in a predetermined range based on a current position of the vehicle 1 and may be determined based on a maximum communicable range of the communication unit 110.

In operation S710, the vehicle 1 may search for all of other vehicles in a predetermined range based on the current position of the vehicle 1. Alternatively, the vehicle 1 may selectively search for only some of all other vehicles in a predetermined range based on the current position of the vehicle 1. In detail, the vehicle 1 may filter at least one of all other vehicles positioned around the vehicle 1 based on a predetermined search condition by a user (e.g., a driver and a passenger). That is, it may be possible to distinguish between other vehicles that satisfy a preset search condition by a user (e.g., a driver and a passenger) and other vehicles that do not satisfy the preset search condition and to provide information to the user as the search result. For example, when 10 other vehicles are positioned in a predetermined range from the vehicle 1 if the user sets a condition A, the vehicle 1 may perform filter the condition A and may guide only other vehicles that satisfy the condition A among the 10 vehicles, to the user. To this end, prior to searching for other vehicles by the communication unit 110, an operation of providing a user interface (e.g., a setting menu) for receiving a search condition from the user may be pre-performed. This will be described below in more detail with reference to FIG. 8.

In operation S720, the controller 170 of the vehicle 1 may control the display unit 141 to display an indicator corresponding to the other vehicles retrieved in operation S710. In this case, the indicator may contain identification information (e.g., a nickname and a vehicle number) of each of the retrieved other vehicles. For example, assuming that two other vehicles are retrieved through operation S710, a nickname of a first other vehicle may be indicated in an indicator corresponding to the first other vehicle and a nickname of a second other vehicle may be indicated in an indicator corresponding to the second other vehicle. Accordingly, the user of the vehicle 1 may learn basic information of the retrieved other vehicles. When a plurality of vehicles is retrieved, the user of the vehicle 1 may easily distinguish between one vehicle and another vehicle through identification information contained in an indicator.

The display unit 141 may include at least one of, for example, (i) a transparent display formed on a windshield of the vehicle 1, (ii) a head up display for outputting an arbitrary image to a projection surface of a projection surface of the windshield, and (iii) a navigation display.

The transparent display may refer to a display that has transmittance with a predetermined level or greater to enable the user to recognize an object positioned at an opposite side across the transparent display, like a general glass. When the transparent display is positioned in front of the windshield of the vehicle 1, the user may advantageously verify various pieces of information related to the vehicle 1 while preventing a front visual field of the user from being obstructed and looking forward.

The head up display may output various images toward, for example, a windshield and, in this case, the windshield may function as a projection surface. To this end, the head up display may include a projector. The head up display and the projector may output using a well known method and, thus, a detailed description thereof will be omitted. Needless to say, it will be obvious to one of ordinary skill in that that the display unit 141 further includes an additional display disposed at a different part of the vehicle 1.

Each indicator displayed by the display unit 141 may be related to a specific vehicle among other vehicles retrieved through operation S710. For example, when the number of vehicles retrieved through operation S710 is one, the display unit 141 may display only one indicator. As another example, when the number of other vehicles retrieved through operation S710 is two, the controller 170 may control the display unit 141 to display two indicators corresponding to the two respective other vehicles.

When an indicator is displayed using the display unit 141, the controller 170 may determine a position of the indicator based on a positional relation between the retrieved other vehicle and the vehicle 1. For example, the controller 170 may compare a current GPS coordinate of the vehicle 1 and a GPS coordinate of another vehicle to determine a direction of the other vehicle and a point of the other vehicle, from which the vehicle 1 is spaced apart. To this end, the communication unit 110 may pre-perform an operation of receiving respective current positions of the retrieved vehicles. Accordingly, the controller 170 may control the display unit 141 to display a front image provided from the front camera 161a and to simultaneously display an indicator adjacently to a part of an entire front image, on which the other vehicle is indicated. That is, the display unit 141 may display a plurality of indicators to overlap on the front image.

In operation S730, the controller 170 of the vehicle 1 may determine whether a first user input is received. The first user input may be an input for selection of any one of the retrieved other vehicles. In detail, the input unit 120 may be arranged in the vehicle 1 and may receive the first user input by the user. The first user input may be any one or a combination of two or more of voice, a gesture, a gaze, and a touch. The first user input may include two or more inputs that are sequentially received.

For example, the camera 122 may photograph an internal part of the vehicle 1 to receive the first user input in the form of a gesture and/or gaze taken by the user.

As another example, the microphone 123 may receive the first user input in the form of voice. Accordingly, the microphone 123 may recognize voice corresponding to the first user input, may convert the voice into an electric signal and, then, may provide the electric signal to the controller 170.

As another example, a touch sensor may receive the first user input using a touch method. The touch sensor may be combined with at least one display included in the display unit 141 and may provide a sensing signal corresponding to a position, a pressure, an area, a coordinate, a duration time, or the like of the first user input to the controller 170. When the first user input is not received in operation S730, the controller 170 may return to operation S720 or may terminate the process S700. When the first user input is received in operation S730, the controller 170 may perform operation S730.

In operation S740, the controller 170 may begin wireless communication with the first other vehicle among the retrieved other vehicles in response to the first user input. Accordingly, vehicle-to-vehicle communication between the vehicle 1 and the first other vehicle may be begun. In detail, the controller 170 may select the first other vehicle that is indicated by the first user input among the retrieved other vehicles and may establish a wireless communication network with the first other vehicle. That is, the first other vehicle refers to one other vehicle or two or more other vehicles corresponding to the first user input.

For example, when the first user input contains user voice, the controller 170 may identify linguistic meaning of voice contained in the first user input using a voice recognition scheme. Then, the controller 170 may select the first other vehicle having identification information corresponding to the identified linguistic meaning from the identification information contained in the aforementioned indicator.

As another example, when the first user input contains a user gesture and/or gaze, the controller 170 may analyze images inside the vehicle 1, received from the camera 122, and may detect and track at least one part of a human body, such as a user face, finger, hand, arm, and head. For example, the controller 170 may detect a gaze direction of the user using an eye tracking scheme. As another example, the controller 170 may compare a 3D reference image pre-stored in the memory 130 and a 3D image that is provided from the camera 122 in real time, may detect parts (e.g., pixels) with a difference of a threshold value or more, and may compare the detected parts and pre-registered gesture patterns to determine a current gesture of the user and a direction thereof. Accordingly, the controller 170 may select the first other vehicle toward which a gesture and/or a gaze are directed among the retrieved other vehicles.

As another example, when the first user input includes a touch of the display unit 141 that displays a list of the retrieved other vehicles, the controller 170 may select the first other vehicle corresponding to the touched list.

When the first user input indicates two or more of the retrieved other vehicles, the controller 170 may control the communication unit 110 to begin wireless communication with two or more other vehicles indicated by the first user input, needless to say.

In operation S750, the controller 170 may control the display unit 141 to display a menu for guiding shared content that is capable of being received from the first other vehicle. The shared content may refer to content that the vehicle 1 is permitted to access among contents stored in the first other vehicle. In detail, the controller 170 may control the communication unit 110 to make a request to the first other vehicle for a list of shared contents to be provided by the first other vehicle. Upon receiving the list of the shared contents from the first other vehicle through the communication unit 110, the controller 170 may generate a user interface for guiding shared content that is receivable from the first other vehicle based on the received list of the shared contents. The user interface may include at least one menu for distinguishing the shared contents by predetermined types. For example, the user interface may include a menu corresponding to an 'accident image', a menu item corresponding to a 'front image', a menu corresponding to 'multimedia', a menu corresponding to a 'portable device', and so on.

In this case, the menu corresponding to the 'accident image' may be used to guide an image at an accident time point, which is pre-captured and stored by the camera 122 included in the first other vehicle. The menu item corresponding to the 'front image' may be used to an image that is currently captured by the camera 122 installed at a front part of the first other vehicle. The menu item corresponding to the 'multimedia' may be used to guide multimedia of music, movies, pictures, etc. stored in the first other vehicle. The menu item corresponding to the 'portable device' may be used to guide shared content to be provided by at least one portable device positioned in the first other vehicle. However, menus included in the user interface may not be limited to the above-listed examples. For example, predetermined types for distinguishing the shared content may further include a different type from the aforementioned types or may be changed to different types from in the above description.

The user interface for guiding the shared content that is capable of being received from the first other vehicle in operation S750 and, accordingly, the user may advantageously and easily recognize shared content desired by the user of the vehicle 1.

In operation S760, the controller 170 of the vehicle 1 may determine whether a second user input is received. The second user input may be a command for receiving at least some of shared contents guided by the user interface. In detail, the input unit 120 may be disposed in the vehicle 1 and may receive the second user input by the user. The second user input may be any one or a combination of two or more of voice, a gesture, a gaze, and a touch. The second user input may include two or more inputs that are sequentially received.

For example, the camera 122 may photograph an internal part of the vehicle 1 to receive the second user input in the form of a gesture and/or gaze taken by the user.

As another example, the microphone 123 may receive the second user input. Accordingly, the microphone 123 may recognize voice corresponding to the second user input, may convert the voice into an electric signal and, then, may provide the electric signal to the controller 170.

As another example, a touch sensor may receive the second user input using a touch method. The touch sensor may be combined with at least one display included in the display unit 141 and may provide a sensing signal corresponding to a position, a pressure, an area, a coordinate, a duration time, or the like of the second user input to the controller 170. When the second user input is not received in operation S760, the controller 170 may return to operation S750 or may terminate the process S700. When the first user input is received in operation S760, the controller 170 may perform operation S770.

In operation S770, the controller 170 of the vehicle 1 may begin to receive at least one piece of specific shared content among shared contents guided through the user interface in response to the second user input. That is, the controller 170 may control the communication unit 110 to receive at least one piece of shared content identified by the second user input among shared contents guided through the user interface.

For example, when the second user input contains user voice, the controller 170 may identify linguistic meaning of the voice included in the second user input using a voice recognition scheme. Then, the controller 170 may begin to receive specific shared content with a time corresponding to the aforementioned identified linguistic meaning among shared contents guided through the menu.

As another example, when the second user input contains a user gesture, the controller 170 may detect the second user input and may begin to receive specific shared content guided in a region indicated by the detected gesture from an entire region of the menu.

As another example, when the second user input contains a user gaze, the controller 170 may begin to receive specific shared content toward which a gaze direction of the user is directed.

As another example, when the second user input contains a touch of one point in a region in which the menu is displayed, the controller 170 may begin to receive specific shared content corresponding to the touched position.

When two or more of shared contents guided through the user interface are specified by the second user input, the controller 170 may control the communication unit 110 to simultaneously or sequentially receive the two or more of shared contents, needless to say.

FIG. 8 is a flowchart of an exemplary process S800 related to FIG. 7. In particular, FIG. 8 may be related to operation S710 shown in FIG. 7.

In operation S810, the controller 170 may control the display unit 141 to display a search menu. The search menu may be one of interfaces provided to a user of the vehicle 1. In detail, the search menu may include a search item for setting at least one search condition. The search condition may be set to provide only a vehicle desired by a user among other vehicles positioned around the vehicle 1 as a search result. For example, the search menu may include at least one of (i) a search item for determining signal strength, (ii) a search item for determining a length of a path common to the vehicle 1, (iii) a search item for determining moving speed, and (iv) a search item for determining a distance from the vehicle 1. Needless to say, a search item for determining other search conditions may be added to the search menu. For example, various inputs (e.g., touch and voice) of each search item included in the search menu may be applied to set a search condition.

In operation S820, the controller 170 may determine whether setting of a search condition using the search menu is completed. According to an embodiment of the present invention, the controller 170 may determine that setting of the search condition is completed based on a user voice command (e.g., "search condition setting is completed"). When, in operation S820, setting of the search condition is determined to be completed, operation S830 may be performed. When, in operation S820, setting of the search condition is determined to be completed, operation S810 may be returned or the process S800 may be terminated.

In operation S830, the controller 170 may control the communication unit 110 to search for other vehicles that are capable of wirelessly communicating with the vehicle 1 based on the search condition that is preset through operation S810. That is, according to the search condition preset through operation S820, all other vehicles around the vehicle 1 may be filtered and only other vehicles that satisfy the search condition may be retrieved by the communication unit 110.

According to an embodiment of the present invention, when a threshold value of the signal strength among search items is determined as a search condition, the communication unit 110 may measure signal strength of a wireless signal transmitted from the other vehicles around the vehicle 1 and may provide only another vehicle, the measured signal strength of which is greater than or equal to a threshold value, as the search result.

According to an embodiment of the present invention, when a threshold value of a length of a common path among search items is determined as a search condition, the controller 170 may compare a path of the vehicle 1 and a path of each of other vehicles and may control the communication unit 110 to provide only other vehicles with a common path therebetween that is greater than or equal to a threshold value, as a search result. For example, when a threshold value of a length of a common path is 5 km, only another vehicle to be driven along the same path as the vehicle 1 with 5 km or more based on a current position of the vehicle 1 may be included in the search result. The path of the other vehicle may be provided via wireless communication from each of the other vehicles.

According to an embodiment of the present invention, when a range of moving speed is determined as a search condition, the controller 170 may control the communication unit 110 to search for only other vehicles that are driven at speed included in the range. For example, when a range of 70 to 80 km/h is determined as a search condition, the communication unit 110 may exclude other vehicles driven at speed less than 70 km/h and other vehicles driven at speed greater than 80 km/h. In this case, speed of the other vehicles may be provided from each of the other vehicles via wireless communication.

According to an embodiment of the present invention, when a threshold value of a distance from the vehicle 1 is determined as a search condition, the controller 170 may control the communication unit 110 to search for only other vehicles positioned within the threshold value from the vehicle 1. For example, when the threshold value of the distance from the vehicle 1 is 150 m, the communication unit 110 may exclude another vehicle that is farther from the vehicle 1 than 150 m from the search result. In this case, the communication unit 110 may compare a position of the vehicle 1 and a position received from each of the other vehicles to determine a distance therebetween.

When a plurality of search conditions is preset, it would be obvious to one of ordinary skill in the art that the communication unit 110 may retrieve only other vehicles that satisfies all of the plurality of search conditions.

Accordingly, even another vehicle that is not capable of providing useful information to a user may be provided as a search result, thereby preventing confusion from being caused to the user.

In operation S840, the controller 170 may set different priority sequences to the other vehicles retrieved through operation S830. In detail, the controller 170 may set a specific priority sequence to each of the other vehicles based on the search condition preset through operation S810.

For example, when a plurality of other vehicles with signal strength of a threshold value or more are retrieved, the controller 170 may priority of the plurality of retrieved other vehicles based on intensity of signal strength. That is, among the retrieved other vehicles, a highest priority sequence may be set to a vehicle corresponding to highest signal strength and a lowest priority sequence may be set to a vehicle corresponding to lowest signal strength.

As another example, when a plurality of other vehicles, a common path with the vehicle 1 of which is greater than or equal to a threshold value, are retrieved, the controller 170 may set a highest priority sequence to another vehicle with a longest length of the common path and set a lowest priority sequence to another vehicle with a shortest length of the common path.

Each of the indicators that have been described above with reference to operation S720 of FIG. 7 may further include information indicating priority. For example, an indicator corresponding to another vehicle with a highest priority sequence may indicate information (e.g., 1) indicating that a highest priority sequence is set and an indicator corresponding to another vehicle with a second highest priority sequence may indicate information (e.g., 2) indicating that a second highest priority sequence is set. Accordingly, the user may verify an indicator displayed by the display unit 141 and, accordingly, the user may advantageously and easily recognize a vehicle that is most appropriate to the user among all of the retrieved other vehicles.

According to an embodiment of the present invention, when only one vehicle is retrieved in operation S830, operation S840 may be omitted.

FIG. 9 is a flowchart of an exemplary process S900 performed by the vehicle 1 according to an embodiment of the present invention. In particular, the process S900 may be begun after operation S770 of FIG. 7 is performed.

In operation S910, the controller 170 may execute at least one function related to steering and speed of the vehicle 1 so as to follow the first other vehicle. In detail, in order to easily receive specific shared content from the first other vehicle through a wireless network, it is necessary to position the vehicle 1 and the first other vehicle within an appropriate distance and, thus, at least one function related to steering and speed of the vehicle 1 may be executed. Accordingly, the vehicle 1 may follow the first other vehicle while performing various operations such as acceleration, deceleration, and lane change.

For example, like in operation S770, upon beginning to receive specific shared content from the first other vehicle, the controller 170 may convert the vehicle 1 into a manual driving mode.

As another example, the controller 170 may control the display unit 141 to output notifications for guiding at least one function required to follow the first other vehicle.

In operation S920, the controller 170 may determine whether reception of the specific shared content is completed. When reception of the specific shared content is completed, the controller 170 may terminate the process S900. When reception of the specific shared content is not completed, the controller 170 may return to operation S910 and may continue to follow the first other vehicle. That is, until reception of the specific shared content is completed, the controller 170 may execute at least one function related to steering and speed of the vehicle 1 so as to follow the first other vehicle.

FIG. 10 is a flowchart of an exemplary process S1000 performed by the vehicle 1 according to an embodiment of the present invention. In particular, the process S1000 may be begun after the process S700 of FIG. 7 and the process S800 of FIG. 8 are performed.

In operation S1010, the controller 170 may determine whether wireless communication with the first other vehicle is cut off. In detail, while specific shared content is received from the first other vehicle, wireless communication between the vehicle 1 and the first other vehicle may be cut off for various reasons. For example, when the first other vehicle rejects a request for wireless communication of the vehicle 1 with the first other vehicle, wireless communication between the vehicle 1 and the first other vehicle may be cut off. As another example, when a malfunction occurs in a wireless communication device installed in the first other vehicle, wireless communication between the vehicle 1 and the first other vehicle may be cut off. As another example, when a wireless communication channel formed between the vehicle 1 and the first other vehicle is obstructed by noise, wireless communication between the vehicle 1 and the first other vehicle may be cut off. As another example, when a distance between the vehicle 1 and the first other vehicle exceeds a range within which wireless communication is possible, wireless communication between the vehicle 1 and the first other vehicle may be cut off.

Upon determining that wireless communication with the first other vehicle is cut off, the controller 170 may perform operation S1020. In this case, the first other vehicle may be excluded from the search result of operation S710 and the controller 170 may control the display unit 141 not to display an indicator indicating the first other vehicle. Upon determining that wireless communication with the first other vehicle is cut off, the process S1000 may be terminated.

In operation S1020, the controller 170 may control the communication unit 110 to begin wireless communication with the second other vehicle set with a highest priority sequence among the other remaining vehicles retrieved through operation S710. According to an embodiment of the present invention, the controller 170 may control the communication unit 110 to automatically begin wireless communication with the second other vehicle. According to an embodiment of the present invention, the controller 170 may control the display unit 141 to display guide information for recommending selection of the second other vehicle and may control the communication unit 110 to begin wireless communication with the second other vehicle in response to a user input indicating selection of the second other vehicle. When the user input indicates selection of a third other vehicle set with a lower priority sequence than the second other vehicle, the controller 170 may control the communication unit 110 to begin wireless communication with the third other vehicle but not the second other vehicle.

FIG. 11 is a flowchart of an exemplary process S1100 performed by the vehicle 1 according to an embodiment of the present invention. In particular, the process S1100 may be begun after the process S700 of FIG. 7 and the process S800 of FIG. 8 are performed.

In operation S1110, the controller 170 may determine a position at which wireless communication with the first other vehicle is to be terminated. According to an embodiment of the present invention, the controller 170 may determine the position at which wireless communication with the first other vehicle is to be terminated based on (i) current speed of the vehicle 1, (ii) a file size of specific shared content that is being received from the first other vehicle, and (iii) a data transfer rate of specific shared content. For example, when the vehicle 1 is driven at constant speed of 25 m/sec, a file size of specific shared content is 1000 Mbite, and a data transfer rate is 100 Mbps, the controller 170 may determine a front point of 250 m from a current position of the vehicle 1 as the position at which wireless communication with the first other vehicle is to be terminated.

According to an embodiment of the present invention, the controller 170 may determine the position at which wireless communication with the first other vehicle is to be terminated based on (i) a path of the vehicle 1 and (ii) a path of the first other vehicle. For example, the controller 170 may determine an end point (point B) of a common path (points A to B) between a path (point A-point B-point C) of the vehicle 1 and a path of (point A-point B-point D) of the first other vehicle as the position at which wireless communication with the first other vehicle is to be terminated. In this case, the determined position may be represented as one GPS coordinate.

In operation S1120, the controller 170 may determine whether the vehicle 1 reaches the determined position. According to an embodiment of the present invention, when a distance between a current position of the vehicle 1, received from the communication unit 110, and the position determined in operation S1110 is within a predetermined value (e.g., 3 m), the controller 170 may determine that the vehicle 1 reaches the determined position. Upon determining that the vehicle 1 reaches the determined position, the controller 170 may perform at least one of operation S1130 and operation S1140.

In operation S1130, the controller 170 may terminate wireless communication with the first other vehicle. Accordingly, irrespective of whether reception of specific shared content provided from the first other vehicle is completed, connection between the vehicle 1 and the first other vehicle in a wireless communication network may be released.

In operation S1140, the controller 170 may control the communication unit 110 to begin wireless communication with the second other vehicle set with a highest priority sequence among the other remaining vehicles retrieved in operation S710. According to an embodiment of the present invention, the controller 170 may control the communication unit 110 to automatically begin wireless communication with the second other vehicle. According to an embodiment of the present invention, the controller 170 may control the display unit 141 to display guide information for recommending selection of the second other vehicle and may control the communication unit 110 to begin wireless communication with the second other vehicle in response to a user input indicating selection of the second other vehicle. When the user input indicates selection of the third other vehicle set with a lower priority sequence than the second other vehicle, the controller 170 may control the communication unit 110 to begin wireless communication with the third other vehicle but not the second other vehicle.

FIG. 12 shows an exemplary indoor view of the vehicle 1 according to an embodiment of the present invention.

Referring to FIG. 12, a driver 21 may verify an outside situation of the vehicle 1 through various devices installed in the vehicle 1. For example, the driver 21 may verify other vehicles 1210, 1220, 1230, 1240, and 1250 positioned in front of the vehicle 1 through a windshield 11. When a wireless communication device for vehicle-to-vehicle communication is installed in each of the other vehicles 1210, 1220, 1230, 1240, and 1250, the communication unit 110 may retrieve at least some of the other vehicles 1210, 1220, 1230, 1240, and 1250.

The display unit 141 may include two or more displays. For example, as shown in FIG. 12, a transparent display 141a coupled to at least one region of the windshield 11, a head up display 141b for projecting a virtual image corresponding to various pieces of information toward the windshield 11, and a navigation display 141c may be arranged in the vehicle 1. The navigation display 141c may be configured to display various pieces of information related to the vehicle 1 as well as path guidance information. Arbitrary information may be simultaneously disposed by two or more displays.

The camera 122 may photograph an inside image of the vehicle 1. To this end, the camera 122 may be arranged at a position at which at least a driver seat is capable of being photographed. For example, as illustrated in the drawing, the camera 122 may be arranged at one upper side of the windshield 11 and may generate an image of a 3D region containing a driver seat and a passenger seat. The controller 170 may detect at least one of a gesture and a gaze of a user (e.g., the driver 21 and a passenger 22) of the vehicle 1 based on images provided from the camera 122. The controller 170 may detect a gesture and/or a gaze of the driver 21 from a portion of the images provided from the camera 122, corresponding to a driver seat, and may detect a gesture and/or a gaze of the passenger 22 from the remaining portion.

The microphone 123 may detect generated in the vehicle 1 and convert the sound into an electric signal. The controller 170 may recognize user voice and may execute at least one function corresponding to the recognized voice based on the electric signal received from the microphone. For example, when the driver 21 issues a command for searching for other vehicles using voice 1260 (e.g., "search for vehicles"), the controller 170 may begin the process S700 of FIG. 7.

The controller 170 may identify a user who makes the voice received by the microphone 123 using a voice authentication scheme.

FIG. 13 shows an exemplary indoor view of the vehicle 1 according to an embodiment of the present invention.

Referring to FIG. 13, in response to a user input for issuing a command for beginning the process S700, the controller 170 may control the display unit 141 to display a user interface to receive at least one search condition.

For example, as shown in FIG. 13, the user interface may be an image 1300 that is displayed by the navigation display 141c in order to set a search condition. The image 1300 may include at least one search item for setting the search condition. In detail, the image 1300 for setting the search condition may include (i) at least one search item 1310, 1320, 1330, and 1340 for determining a search condition related to a driving state and (ii) at least one search item 1360, 1370, 1380, and 1390 for determining a type of shared content or a device. The user may input a search condition for at least one search item using a touchscreen or other input devices.

In detail, the controller 170 may set a search condition (e.g., '100 Mbps or more') related to a data transfer rate based on a user input of the first search item 1310. The controller 170 may set a search condition (e.g., 'between 70 km/h and 110 km/h') related to moving speed based on a user input of the second search item 1320. The controller 170 may set a search condition (e.g., '5 km or more') related to a length of a common path based on a user input of the third search item 1330. The controller 170 may set a search condition (e.g., 'within 100 m') related to a distance based on a user input of the fourth search item 1340. The controller 170 may set search condition for searching for only other vehicles that are capable of providing an accident image based on a user input of the fifth search item 1350. The controller 170 may set a search condition for searching for only other vehicles that are capable of providing a front image based on a user input of the sixth search item 1360. The controller 170 may set a search condition for searching for only other vehicles that are capable of providing multimedia content (e.g., movies) based on a user input of the seventh search item 1370. The controller 170 may set a search condition for searching for only other vehicles with a portable device positioned therein among all other vehicles around the vehicle 1 based on a user input of the eighth search item 1380.

It is to be understood that the item items and search conditions shown in FIG. 13 are exemplary and various modifications may be formed therein. For example, some search items of the search items shown in FIG. 13 may be omitted or other search conditions may be added.

Referring to FIG. 13, only other vehicles desired by a user of the vehicle 1 may be provided as a search result according to a search condition and, thus, user convenience may be enhanced compared with a method of providing all other vehicles that are positioned around the vehicle 1 and are capable of performing wireless communication as a search result.

FIGS. 14A to 14D show an exemplary search result provided by the vehicle 1 according to an embodiment of the present invention.

Information on other vehicles retrieved by the communication unit 110, that is, a search result may be displayed by at least one of the transparent display 141a, the head up display 141b, and the navigation display 141c included in the display unit 141. For example, other vehicles contained in the search result may be retrieved in operation S710 described with reference to FIGS. 7 and 8.

For convenience of description, it may be assumed that, among other vehicles 1210, 1220, 1230, 1240, and 1250 around the vehicle 1, only three other vehicles 1210, 1220, and 1230 satisfy all preset search conditions and the fourth and fifth other vehicles 1240 and 1250 do not satisfy at least one of the preset search conditions.

It may be assumed that identification information of the three other vehicles 1210, 1220, and 1230 include a nickname and is 'Julie's car', 'Daniel's car', and 'Jordan's car', sequentially.

The three other vehicles 1210, 1220, and 1230 may be set with different priority sequences according to a preset condition. For example, as a distance with the vehicle 1 is shorter, a higher priority sequence may be set. It may be assumed that a highest priority sequence is set for the other vehicle 1210, a second highest priority sequence is set for the other vehicle 1220, and a lowest priority sequence is set for the other vehicle 1230. In this case, an indicator corresponding to each of the three other vehicles 1210, 1220, and 1230 may include information for guiding a priority sequence.

FIG. 14A illustrates an example in which an image 1410 for guiding a list of the three other vehicles 1210, 1220, and 1230 contained in a search result is displayed on the navigation display 141c. Needless to say, the image 1410 may be displayed by the transparent display 141a and/or the head up display 141b.

In detail, the image 1410 may include indicators 1411, 1412, and 1413 that correspond to the retrieved other vehicles 1210, 1220, and 1230, respectively. For example, the first indicator 1411 may correspond to the other vehicle 1210, the second indicator 1412 may correspond to the other vehicle 1220, and the third indicator 1413 may correspond to the other vehicle 1230. Identification information is indicated in each of the indicators 1411, 1412, and 1413 therewith and, thus, a user of the vehicle 1 may easily distinguish between any one and the other one among the retrieved other vehicles 1210, 1220, and 1230.

The indicators 1411, 1412, and 1413 may be aligned according to priority sequences set for other vehicles corresponding to the indicators. For example, the indicator 1411 corresponding to the other vehicle 1210 set with a highest priority sequence may be indicated at an uppermost end of the image 1410, the indicator 1412 corresponding to the other vehicle 1220 set with a second highest priority sequence may be indicated at a lower portion than the indicator 1411, and the indicator 1413 corresponding to the other vehicle 1230 set with a lowest priority sequence may be indicated at a lower portion than the indicator 1412. As shown in the drawing, the indicators 1411, 1412, and 1413 may further include information (e.g., '1', '2', and '3') for guiding priority sequences set for the other vehicles 1210, 1220, and 1230 corresponding to the indicators, respectively. Accordingly, the user may intuitively recognize a most advantageous vehicle for wireless communication.

For example, the passenger 22 may select any one of indicators included in the image 1410 using a touch sensor coupled to the navigation display 141c. Accordingly, the controller 170 may control the communication unit 110 to begin wireless communication with the other vehicle 1210 corresponding to the selected indicator.

FIG. 14B shows an example in which an image 1420 for guiding the three other vehicles 1210, 1220, and 1230 contained in a search result is displayed. Needless to say, the image 1420 may be displayed by the transparent display 141a and/or the head up display 141b.

In detail, the image 1420 may include indicators 1421, 1422, and 1423 that correspond to the retrieved other vehicles 1210, 1220, and 1230, respectively. Differently from FIG. 14A, the controller 170 may display the indicators 1421, 1422, and 1423 as a predetermined mark (e.g., a triangle). The indicator 1424 corresponding to the vehicle 1 may be indicated in the image 1420. The image 1420 may be displayed in the form of a top view and the controller 170 may change positions of the indicators 1421, 1422, and 1423 in the image 1420 according to a positional relation between the vehicle 1 and the retrieved other vehicles 1210, 1220, and 1230.

Referring to FIG. 14B, the first indicator 1421 may correspond to the other vehicle 1210, the second indicator 1422 may correspond to the other vehicle 1220, and the third indicator 1423 may correspond to the other vehicle 1230. Identification information of the other vehicles 1210, 1220, and 1230 corresponding to the indicators is indicated in the respective indicators 1421, 1422, and 1423 and, thus, the user of the vehicle 1 may easily distinguish between any one and the other one among the retrieved other vehicles 1210, 1220, and 1230. In addition, the user may estimate a relative positional difference between the vehicle 1 and the other vehicles 1210, 1220, and 1230 based on positions of the indicators 1421, 1422, and 1423 indicated in the image 1420.

As shown in the drawing, regions in which the indicators 1421, 1422, and 1423 are displayed, respectively, may further include information (e.g., '1', '2', and '3') for guiding priority sequences set for the other vehicles 1210, 1220, and 1230. Accordingly, the user may intuitively recognize a most advantageous vehicle for wireless communication.

The user may select any one of indicators included in the image 1420 using the microphone 123. For example, as shown in the drawing, when the driver 21 makes voice (e.g., "Select Julie's car") indicating a specific nickname among nicknames indicated in the image 1420, the controller 170 may receive an electric signal corresponding to the corresponding voice and may begin wireless communication with the other vehicle 1210.

FIGS. 14C and 14D show an example in which three indicators 1431, 1432, and 1433 corresponding to the three other vehicles 1210, 1220, and 1230 contained in a search result are displayed on the windshield 11. In this case, the indicators 1431, 1432, and 1433 may be output by any one of the transparent display 141a and the head up display 141b.

In detail, the controller 170 may determine a partial region of the windshield 11 for displaying each of the indicators 1431, 1432, and 1433 based on a current position (e.g., a GPS coordinate) of each of the retrieved other vehicles 1210, 1220, and 1230 and may control the display unit 141 to display the indicators 1431, 1432, and 1433 on the determined partial region. For example, the other vehicle 1210 is positioned at the left side compared with the two other vehicles 1220 and 1230 based on the position of the vehicle 1 and, thus, the controller 170 may control the display unit 141 to display the indicator 1431 corresponding to the other vehicle 1210 at the left side compared with the two other indicators 1431 and 1432.

The controller 170 may update regions of the windshield 11, on which the indicators 1431, 1432, and 1433 are to be displayed, in real time or periodically according to a positional relation between the vehicle 1 and the retrieved other vehicles 1210, 1220, and 1230.

Referring to FIGS. 14C and 14D, the first indicator 1431 may correspond to the other vehicle 1210, the second indicator 1432 may correspond to the other vehicle 1220, and the third indicator 1433 may correspond to the other vehicle 1230. Identification information is indicated in each of the indicators 1431, 1432, and 1433 therewith and, thus, a user of the vehicle 1 may easily distinguish between any one and the other one among the retrieved other vehicles 1210, 1220, and 1230.

As shown in the drawing, regions in which the indicators 1431, 1432, and 1433 are displayed, respectively, may further include information (e.g., '1', '2', and '3') for guiding priority sequences set for the other vehicles 1210, 1220, and 1230. In addition, the controller 170 may apply different visual effects to the indicators 1431, 1432, and 1433 according to priority sequences set for the other vehicles 1210, 1220, and 1230. Accordingly, the user may intuitively recognize a most advantageous vehicle for wireless communication.

The user may select any one of indicators displayed on the windshield 11 using a gesture and/or a gaze. For example, as shown in FIG. 14C, the controller 170 may detect a gaze direction of the driver 21 based on an image provided from the camera 122. Accordingly, the controller 170 may select the indicator 1431 corresponding to the gaze direction and may begin wireless communication with the other vehicle 1210 corresponding to the selected indicator 1431. As another example, as shown in FIG. 14D, the controller 170 may select the indicator 1431 indicated by a gesture of the passenger 22 based on an image provided from the camera 122 and may begin wireless communication with the other vehicle 1210 corresponding to the selected indicator 1431.

FIGS. 15A and 15B show exemplary user interfaces displayed by the display unit 141 according to an embodiment of the present invention. For convenience of description, it is assumed that wireless communication with the other vehicle 1210 is begun according to a user input.

Referring to FIG. 15A, as wireless communication with the other vehicle 1210 is begun, the controller 170 may control the display unit 141 to display a user interface 1510 containing a menu for guiding shared contents that are receivable from the other vehicle 1210. In this case, as shown in the drawing, the controller 170 may generate a predetermined visual effect (e.g., highlighting and color change) in the indicator 1431 corresponding to the other vehicle 1210.

The user interface 1510 may include at least one menu 1511, 1512, 1513, 1514, 1515, 1516, and 1517. Each menu is used to distinguish shared convents receivable from the other vehicle 1210 by types. The user may select a specific menu contained in the user interface 1510 or may release selection using a touch sensor, the microphone 123, or other input devices.

The controller 170 may provide information of content corresponding to movie among shared contents of the other vehicle 1210 based on a user input for selection of the first menu 1511. The controller 170 may provide information of content corresponding to music among the shared contents of the other vehicle 1210 based on a user input for selection of the second menu 1512. The controller 170 may provide information of content corresponding to a picture among the shared contents of the other vehicle 1210 based on a user input for selection of the third menu 1513. The controller 170 may provide information of content corresponding to a map among the shared contents of the other vehicle 1210 based on a user input for selection of the fourth menu 1514. The controller 170 may provide information of content corresponding to an accident image among the shared contents of the other vehicle 1210 based on a user input for selection of the fifth menu 1515. The controller 170 may provide information of content corresponding to a front image among the shared contents of the other vehicle 1210 based on a user input for selection of the sixth menu 1516. The controller 170 may provide information of content corresponding to an e-coupon among the shared contents of the other vehicle 1210 based on a user input for selection of the seventh menu 1517.

The controller 170 may simultaneously provide information of contents corresponding to two or more of the first to seventh menus 1511, 1512, 1513, 1514, 1515, 1516, and 1517 based on a user input. The user interface 1510 shown in FIG. 15A may be exemplary and, in some embodiments, may be changed.

FIG. 15B shows an exemplary user interface 1520 that is provided when the first menu 1511 of the user interface 1510 shown in FIG. 15A is selected.

As described above, the first menu 1511 corresponds to movie among shared contents and, thus, the user interface 1520 may indicate menus 1521, 1522, 1523, 1524, 1525, and 1526 that respectively correspond to movies receivable from the other vehicle 1210. The user may select a specific menu contained in the user interface 1520 or may release selection using a touch sensor, the microphone 123, or other input devices. The menu selected by the user may be displayed to be distinguished from a menu that is not selected. For example, as shown in the drawing, when the user selects the third and fifth menus 1523 and 1525, the display unit 141 may display the third and fifth menus 1523 and 1525 as darker than the other menus 1521, 1522, 1524, and 1526.

When the user touches a menu 1531 corresponding to a function for returning to a previous image, the controller 170 may convert the user interface 1520 into the user interface 1510. When the user touches a menu 1532 corresponding to a download function, the controller 170 may control the communication unit 110 to begin to receive movies #1 and #6 corresponding to the selected third and fifth menus 1523 and 1525.

FIG. 16 shows an exemplary user interface 1610 displayed by the display unit 141 according to an embodiment of the present invention.

The user interface 1610 shown in FIG. 16 may be provided, for example, after wireless communication between the vehicle 1 and the other vehicle 1210 is begun in operation S740 of FIG. 7.

The user interface 1610 may include menus 1611, 1612, 1613, and 1614 for selection a plurality of predetermined functions for following any one of other vehicles. In this case, the plurality of functions and the menus 1611, 1612, 1613, and 1614 may have one to one correspondence.

In detail, the controller 170 may determine whether an adaptive cruise control function is executed, based on a user input of the first menu 1611. When the adaptive cruise control function is executed, the vehicle 1 may automatically control speed of the vehicle 1 and a distance from a front vehicle based on surrounding obstacle information detected by the sensing unit 160 or may output information related thereto to the user. The controller 170 may determine whether an autonomous emergency braking function is executed, based on a user input of the second menu 1612. When the autonomous emergency braking function is executed, the vehicle 1 may expect crash with a front obstacle based on the surrounding obstacle information detected by the sensing unit 160 and may control the vehicle driver 150 to operate a brake. The controller 170 may determine whether a lane change assist function is executed, based on a user input of the third menu 1613. When the lane change assist function is executed, the controller 170 may detect an obstacle in a dead zone that is not seen by a user in the vehicle 1 that is changing a lane and may provide an alert thereof based on the surrounding obstacle information detected by the sensing unit 160. The controller 170 may determine whether a night vision function is executed, based on a user input of the fourth menu 1614. When the night vision function is executed, the controller 170 may display an infrared image provided from the infrared camera 122 included in the vehicle 1 on the display unit 141. The user may touch any one of a turn-on button and a turn-off button included in each menu to issue a command for executing or shutting off a function corresponding to each menu.

For example, as shown in the drawing, when the passenger 22 touches a turn-on button of the first and third menus 1611 and 1613 and touches a turn-off button of the second and fourth menus 1612 and 1614, the controller 170 may control the vehicle driver 150 of the vehicle 1 to execute only the adaptive cruise control function and the lane change assist function.

The controller 170 may change the number and/or type of the menu included in the user interface 1610 based on a state and/or outer environment of the vehicle 1. For example, when the vehicle 1 is positioned in a road in which a lane is not drawn, the controller 170 may remove the third menu 1613 from the user interface 1610. As another example, the fourth menu 1614 may be included in the user interface 1610 only when illumination outside the vehicle 1 is less than a threshold value. The illumination outside the vehicle 1 may be detected by an illumination sensor included in the sensing unit 160.

FIG. 17A shows an exemplary user interface 1710 displayed by the display unit 141 according to an embodiment of the present invention.

The user interface 1710 shown in FIG. 17A may be provided, for example, when wireless communication between the vehicle 1 and the other vehicle 1210 is determined to be cut off in operation S1010 of FIG. 10. In this case, the indicator 1210 (refer to FIG. 16, etc.) corresponding to the other vehicle 1210 may not be displayed any longer. In addition, priority sequences set for the other vehicles 1220 and 1230 may be enhanced by one stage.

The user interface 1710 may include a menu corresponding to at least one of other vehicles that are capable of performing wireless communication. For example, as shown in the drawing, two menus 1711 and 1712 that respectively correspond to the two vehicles 1220 and 1230 obtained by excluding the other vehicle 1210, wireless communication of which is cut off, from the all of the retrieved other vehicles 1210, 1220, and 1230 may be included in the user interface 1710. That is, the controller 170 may recommend at least one of other vehicles, wireless communication of which is newly begun.

The menus 1711 and 1712 may include information for guiding priority sequences that are set for the two other vehicles 1220 and 1230, respectively. In detail, the menu 1711 may indicate 'Recommend 1' as a text for guiding a priority sequence of the other vehicle 1220 and 'Daniel's car' as a text for guiding a nickname contained in identification information of the other vehicle 1220. The menu 1712 may indicate 'Recommend 2' as a text for guiding a priority sequence of the other vehicle 1230 and 'Jordan's car' as a text for guiding a nickname included in nickname information of the other vehicle 1230. The user interface 1710 may further include a menu 1713 for search for other vehicles other than the pre-retrieved other vehicles 1220 and 1230. When the user selects the menu 1713 using a touch sensor, or the like, the controller 170 may perform operation S710 of FIG. 7 and may provide information on other vehicles that are newly retrieved at a current time to the user.

FIG. 17B shows an exemplary user interface 1720 displayed by the display unit 141 according to an embodiment of the present invention.

The user interface 1720 may be an image displayed for guiding the position determined in, for example, operation S1110 of FIG. 11. Differently from FIG. 17A, wireless connection with the other vehicle 1210 is maintained and, thus, the indicator 1210 may not disappear and may be continuously displayed.

The user interface 1720 may include text information (e.g., "Wireless communication with Julie's car is cut off after about 1 km ahead") for guiding a position at which wireless communication with the other vehicle 1210 is to be terminated and a menu corresponding to at least one of other vehicles that are capable of performing wireless communication. For example, as shown in the drawing, the two menus 1721 and 1722 that respectively correspond to the two other vehicles 1220 and 1230 obtained by excluding the other vehicle 1210, wireless communication of which is cut off, among the all of the retrieved other vehicles 1210, 1220, and 1230 may be included in the user interface 1720.

Similarly to FIG. 17A, the menus 1721 and 1722 may include information for guiding priority sequences that are set for the two other vehicles 1220 and 1230, respectively. In detail, the menu 1721 may indicate 'Recommend 1' as a text for guiding a priority sequence of the other vehicle 1220 and 'Daniel's car' as a text for guiding a nickname included in identification information of the other vehicle 1220. The menu 1722 may indicate 'Recommend 2' as a text for guiding a priority sequence of the other vehicle 1230 and 'Jordan's car' as a text for guiding a nickname included in identification information of the other vehicle 1230. The user interface 1720 may further include a menu 1723 for searching for other vehicles other than the pre-retrieved other vehicles 1220 and 1230. When the user selects the menu 1723 using a touch sensor or the like, the controller 170 may perform operation S710 of FIG. 7 and may provide information on other vehicles that are newly retrieved at a current time to the user.

FIG. 18A shows an exemplary indoor view of the vehicle 1 according to an embodiment of the present invention.

Referring to FIG. 18A, the vehicle 1 may simultaneously receive a user input of the driver 21 and a user input of the passenger 22.

In detail, the controller 170 may divide an image provided from the camera 122 into a first region and a second region. According to an embodiment of the present invention, the first region may include a driver seat, the second region may a passenger seat, and the first and second regions may be 3D regions that do not overlap. Accordingly, the controller 170 may detect a gesture and/or a gaze of the driver 21 from the first region and, simultaneously, may detect a gesture and/or a gaze of the passenger 22 from the second region.

The controller 170 may identify whether voice received by the microphone 123 is from the driver 21 or the passenger 22 using a voice authentication scheme. To this end, a procedure of storing a voice pattern of each of the driver 21 and the passenger 22 may be pre-performed.

As shown in FIG. 18A, the driver 21 may point out the indicator 1431 corresponding to the other vehicle 1210 using a gesture or voice 1801. Simultaneously, the passenger 22 may point out the indicator 1433 corresponding to the other vehicle 1230 using a gesture or voice 1802.

When the driver 21 and the passenger 22 point out different indicators, the controller 170 may provide a user interface for guiding shared contents receivable from the other vehicles 1210 and 1230 that correspond to the pointed-out indicators 1431 and 1433, respectively. This will be described in more detail with reference to FIG. 18B.

FIG. 18B shows an exemplary indoor view of the vehicle 1 of FIG. 18A.

Referring to FIG. 18B, the controller 170 may control the display unit 141 to display a user interface 1810 in response to a user input of the driver 21 and a user input of the passenger 22. For example, as shown in the drawing, the user interface 1810 may be displayed by the navigation display 141c.

The user interface 1810 may include a sub-image 1820 and a sub-image 1830. The sub-image 1820 may guide shared contents receivable from the other vehicle 1210 selected according to the user input of the driver 21. The sub-image 1830 may guide shared contents receivable from the other vehicle 1230 selected according to the user input of the passenger 22.

The sub-image 1820 may include a plurality of menus 1821 to 1827 for guiding types of shared contents receivable from the other vehicle 1210. The sub-image 1830 may include a plurality of menus 1831 to 1837 for guiding shared contents receivable from the other vehicle 1230. Seven types shown in FIG. 18B may be predetermined and may be changed according to a user input.

At least one of the menus 1821, 1823, and 1827 included in the sub-image 1820 may be deactivated. In more detail, when the vehicle 1 is being driven at predetermined speed (e.g., 20 km/h) or more, the controller 170 may perform control such that the menus 1821 and 1823 corresponding to a predetermined type (e.g., movies and pictures) do not respond to a user input of t the driver 21 so as to prevent selection of the driver 21. Accordingly, a type of content that is not related to driving or obstructs driving, such as movies, pictures, etc. may be prevented from being displayed on the display unit 141 according to a request of the driver 21, thereby advantageously lowering accident danger.

The aforementioned embodiments of the present invention are not embodied through an apparatus and a method only and may be embodied through a program for implementing a function corresponding to the configuration according to the embodiments of the present invention or a recording medium for recording the program thereon and, accordingly, may be easily embodied from the above description of the embodiments by one of ordinary sill in the art.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:
1. A vehicle comprising:
a display unit;
a communication unit configured to wirelessly communicate with an external device; and
a controller configured to:
  display a plurality of indicators on the display unit, wherein the plurality of indicators respectively corresponds to a plurality of other vehicles that are capable of wirelessly communicating with the vehicle, and wherein each indicator contains identification information of a specific vehicle of the plurality of other vehicles;

begin wireless communication with a first other vehicle included in the plurality of other vehicles in response to a first user input;

display a user interface indicating shared contents receivable from the first other vehicle;

measure, through the communication unit, signal strength of a wireless signal transmitted by vehicles around the vehicle;

determine the plurality of other vehicles to include one or more of the vehicles around the vehicle having measured signal strength greater than or equal to a predetermined threshold value; and assign a priority to each of the plurality of other vehicles based on respective signal strengths, wherein the plurality of indicators includes information on priorities of the plurality of other vehicles.

2. The vehicle according to claim 1, wherein the display unit comprises at least one of a transparent display formed on a windshield of the vehicle, a head up display (HUD) for outputting an arbitrary image toward the windshield, and a navigation display.

3. The vehicle according to claim 1, further comprising an external camera configured to generate a front image of the vehicle.

4. The vehicle according to claim 3, wherein the controller detects at least one of the plurality of other vehicles from the front image based on a current position of each of the plurality of other vehicles provided from the communication unit.

5. The vehicle according to claim 1, wherein the controller controls the communication unit to begin wireless communication with a second other vehicle assigned with the highest priority among the plurality of other vehicles when wireless communication between the vehicle and the first other vehicle is cut off.

6. The vehicle according to claim 1, wherein the user interface comprises at least one menu for distinguishing the shared contents by types.

7. The vehicle according to claim 1, wherein the vehicle determines a time at which wireless communication with the first other vehicle is to be terminated, based on at least one of driving information of the vehicle and driving information of the first other vehicle, and terminates wireless communication with the first other vehicle and begins wireless communication with a second other vehicle included in the plurality of other vehicles when the time is reached.

8. A vehicle comprising:
a display unit;
a communication unit configured to wirelessly communicate with an external device;
an external camera configured to generate a front image of the vehicle; and
a controller configured to:
display a plurality of indicators on the display unit, wherein the plurality of indicators respectively corresponds to a plurality of other vehicles that are capable of wirelessly communicating with the vehicle, and wherein each indicator contains identification information of a specific vehicle of the plurality of other vehicles;
begin wireless communication with a first other vehicle included in the plurality of other vehicles in response to a first user input; and
display a user interface indicating shared contents receivable from the first other vehicle;
wherein the controller controls the display unit to overlay the plurality of indicators on the front image.

9. A vehicle comprising:
a display unit;
a communication unit configured to wirelessly communicate with an external device; and
a controller configured to:
display a plurality of indicators on the display unit, wherein the plurality of indicators respectively corresponds to a plurality of other vehicles that are capable of wirelessly communicating with the vehicle, and wherein each indicator contains identification information of a specific vehicle of the plurality of other vehicles;
begin wireless communication with a first other vehicle included in the plurality of other vehicles in response to a first user input;
display a user interface indicating shared contents receivable from the first other vehicle;
receive a specific shared content among the shared contents in response to a second user input; and
execute at least one function associated with steering and speed of the vehicle so as to follow the first other vehicle until reception of the specific shared content is completed.

10. The vehicle according to claim 9, wherein each of the first user input and the second user input is any one of voice, a gesture, a gaze, and a touch.

11. The vehicle according to claim 9, further comprising an input unit configured to receive the first user input and the second user input.

12. The vehicle according to claim 9, wherein the controller controls the communication unit to transmit the received specific shared content to a portable device positioned in the vehicle.

13. A method of controlling a vehicle, the method comprising:
searching, through a communication unit, for a plurality of other vehicles that are capable of wirelessly communicating with the vehicle;
displaying a plurality of indicators on a display unit, wherein the plurality of indicators respectively corresponds to the plurality of other vehicles, and wherein each indicator contains identification information of a specific vehicle of the plurality of other vehicles;
selecting, by a controller, a first other vehicle included in the plurality of other vehicles in response to a first user input;
displaying, on the display unit, a menu indicating shared contents receivable from the first other vehicle;
measuring, through the communication unit, signal strength of a wireless signal transmitted by vehicles around the vehicle;
determining the plurality of other vehicles to include one or more of the vehicles around the vehicle having measured signal strength greater than or equal to a predetermined threshold value; and
assigning a priority to each of the plurality of other vehicles based on respective signal strengths,
wherein the plurality of indicators includes information on priorities of the plurality of other vehicles.

14. The method according to claim 13, further comprising setting different priority sequences for the plurality of other vehicles according to a preset search condition by the plurality of other vehicles.

15. The method according to claim 13, further comprising receiving specific shared contents of the shared contents in response to a second user input.

16. A driving assistance apparatus for a vehicle, comprising:
a controller configured to:
search for a plurality of other vehicles positioned around the vehicle that are capable of wirelessly communicating with the vehicle;
display a plurality of indicators on a display unit, wherein the plurality of indicators respectively corresponds to the plurality of other vehicles, and wherein each indicator contains identification information of a specific vehicle of the plurality of other vehicles;
determine that a first user input is received, the first user input being an input for selection of one of the plurality of other vehicle;
transmit a signal for beginning wireless communication with a first other vehicle included in the plurality of other vehicles in response to the first user input;
display, on the display unit, a user interface indicating shared contents receivable from the first other vehicle;
measure signal strength of a wireless signal transmitted by vehicles positioned around the vehicle;
determine the plurality of other vehicles to include one or more of the vehicles around the vehicle having measured signal strength greater than or equal to a predetermined threshold value; and
assign a priority to each of the plurality of other vehicles based on respective signal strengths,
wherein the plurality of indicators includes information on priorities of the plurality of other vehicles.

* * * * *